United States Patent
Meier et al.

(10) Patent No.: US 9,310,499 B2
(45) Date of Patent: Apr. 12, 2016

(54) LOW FREQUENCY SEISMIC ACQUISITION USING A COUNTER ROTATING ECCENTRIC MASS VIBRATOR

(71) Applicants: Mark A. Meier, Houston, TX (US); Steven E. Heiney, Houston, TX (US); Jelena Tomic, Houston, TX (US); Paul Ibanez, Boulder, CO (US); Conor N. Byrne, Boulder, CO (US)

(72) Inventors: Mark A. Meier, Houston, TX (US); Steven E. Heiney, Houston, TX (US); Jelena Tomic, Houston, TX (US); Paul Ibanez, Boulder, CO (US); Conor N. Byrne, Boulder, CO (US)

(73) Assignee: ExxonMobil Upstream Research Company, Houston, TX (US)

( * ) Notice: Subject to any disclaimer, the term of this patent is extended or adjusted under 35 U.S.C. 154(b) by 14 days.

(21) Appl. No.: 14/327,690

(22) Filed: Jul. 10, 2014

(65) Prior Publication Data

US 2015/0041242 A1 Feb. 12, 2015

Related U.S. Application Data

(60) Provisional application No. 61/864,816, filed on Aug. 12, 2013.

(51) Int. Cl.
*G01V 1/153* (2006.01)
*G01V 1/155* (2006.01)
(Continued)

(52) U.S. Cl.
CPC .............. *G01V 1/153* (2013.01); *B06B 1/164* (2013.01)

(58) Field of Classification Search
CPC ........ G01V 1/155; G01V 1/153; G01V 1/143
USPC .................. 181/121, 113, 401, 108; 367/189
See application file for complete search history.

(56) References Cited

U.S. PATENT DOCUMENTS

| 2,921,477 A | 1/1960 | Hanggi |
| 2,989,869 A * | 6/1961 | Hanggi ................. B06B 1/164 404/113 |
| 3,059,483 A | 10/1962 | Clynch et al. |

(Continued)

FOREIGN PATENT DOCUMENTS

| GB | 2 103 794 | 2/1983 |
| SU | WO 9100533 A1 * | 1/1991 ............ G01V 1/153 |

OTHER PUBLICATIONS

Alekeseev et al. (2005), "Powerful low-frequency vibrators for active seismology," *Bulletin of the Seismological Society of America*, 95(1), pp. 1-17.

(Continued)

*Primary Examiner* — Edgardo San Martin
(74) *Attorney, Agent, or Firm* — ExxonMobil Upstream Research Company, Law Dept.

(57) ABSTRACT

Method for seismic prospecting using counter-rotating (207-208) eccentric-mass (201, 202) vibrator (CREMV) technology adapted as vibrator sources for seismic prospecting to produce controlled sweeps, as in the manner used in modern seismic prospecting, but with large forces at low frequencies, e.g. forces >275 kN at frequencies between 1 and 5 Hz. This is achieved by adapting the CREMV to enable rotational frequency and the eccentricity (205, 206) of the masses relative to their rotation axes (203-204) to be varied independently and simultaneously, and by designing the CREMV such that the radius of rotation of the center of mass of each rotating mass is on the order of 50 cm or more. The low frequency data obtained from such a seismic source enables improved detection and resolution of subsurface structures and better determination of subsurface properties.

27 Claims, 22 Drawing Sheets

(51) Int. Cl.
*B06B 1/16* (2006.01)
*G01V 1/143* (2006.01)

(56) References Cited

U.S. PATENT DOCUMENTS

| | | | |
|---|---|---|---|
| 3,185,250 A | 5/1965 | Glazier | |
| 3,244,252 A | 4/1966 | Bums | |
| 3,280,935 A | 10/1966 | Brown | |
| 3,288,243 A | 11/1966 | Silverman | |
| 3,407,670 A | 10/1968 | Venanzetti | |
| 4,026,383 A | 5/1977 | Bedenbender et al. | |
| 4,234,053 A * | 11/1980 | Erich, Jr. | G01V 1/375 181/121 |
| 4,327,814 A * | 5/1982 | Erich, Jr. | G01V 1/053 181/121 |
| 4,375,927 A * | 3/1983 | Kniep | E02D 3/074 173/49 |
| 4,484,656 A | 11/1984 | Bird | |
| 4,635,747 A | 1/1987 | Bird, Sr. et al. | |
| 4,658,930 A | 4/1987 | Bird | |
| 4,749,057 A | 6/1988 | Anstey | |
| 4,751,687 A | 6/1988 | Christensen | |
| 4,797,862 A | 1/1989 | Wisotsky | |
| 4,853,906 A * | 8/1989 | Cole | G01V 1/155 181/114 |
| 4,907,670 A * | 3/1990 | Anstey | G01V 1/006 181/121 |
| 4,959,818 A * | 9/1990 | Cole | G01V 1/053 181/114 |
| 5,177,386 A * | 1/1993 | Shimada | B06B 1/166 310/81 |
| 5,252,785 A | 10/1993 | Christensen | |
| 5,410,517 A | 4/1995 | Andersen | |
| 5,717,170 A * | 2/1998 | Anstey | G01V 1/153 181/113 |
| 5,757,726 A | 5/1998 | Tenghamn et al. | |
| 5,786,537 A * | 7/1998 | Anstey | G01V 1/153 181/121 |
| 5,978,316 A | 11/1999 | Ambs et al. | |
| 6,065,562 A | 5/2000 | Bird et al. | |
| 6,493,636 B1 | 12/2002 | DeKok | |
| 6,516,679 B2 * | 2/2003 | Yates | B06B 1/164 404/117 |
| 6,687,619 B2 | 2/2004 | Moerig et al. | |
| 6,842,701 B2 | 1/2005 | Moerig et al. | |
| 6,865,488 B2 | 3/2005 | Moerig et al. | |
| 7,330,401 B2 | 2/2008 | Jeffryes et al. | |
| 7,377,357 B2 * | 5/2008 | Duren | G01V 1/04 181/108 |
| 7,551,518 B1 | 6/2009 | Tenghamn | |
| 7,881,158 B2 | 2/2011 | Tenghamn | |
| 7,929,379 B2 | 4/2011 | Kamata et al. | |
| 8,027,223 B2 * | 9/2011 | West et al. | G01V 1/143 357/189 |
| 8,027,225 B2 | 9/2011 | Kamata et al. | |
| 8,081,540 B2 | 12/2011 | Ross | |
| 8,096,678 B2 | 1/2012 | Jones, III et al. | |
| 8,188,975 B2 | 5/2012 | Jung | |
| 8,189,426 B2 | 5/2012 | West et al. | |
| 8,446,798 B2 | 5/2013 | Tenghamn | |
| 8,687,464 B2 | 4/2014 | Thompson et al. | |
| 2006/0250891 A1 | 11/2006 | Krohn | |
| 2010/0118647 A1 | 5/2010 | Tenghamn | |
| 2011/0032795 A1 | 2/2011 | Kragh et al. | |
| 2011/0134718 A1 | 6/2011 | Van Borselen et al. | |
| 2011/0205842 A1 | 8/2011 | Baeten | |
| 2011/0299360 A1 | 12/2011 | Lansley et al. | |
| 2011/0308337 A1 * | 12/2011 | Nguyen | F16H 33/00 74/61 |
| 2012/0145476 A1 | 6/2012 | Kamata | |
| 2012/0257208 A1 | 10/2012 | Andersen et al. | |
| 2012/0257209 A1 | 10/2012 | Andersen et al. | |
| 2013/0028051 A1 | 1/2013 | Barkved et al. | |
| 2013/0188459 A1 * | 7/2013 | Eick | G01V 1/153 367/189 |
| 2013/0238249 A1 | 9/2013 | Xu et al. | |
| 2014/0016436 A1 | 1/2014 | Söllner et al. | |
| 2014/0027122 A1 | 1/2014 | Meier et al. | |
| 2014/0036637 A1 | 2/2014 | Barone et al. | |
| 2014/0060958 A1 | 3/2014 | Eick et al. | |

OTHER PUBLICATIONS

Crawford, J.M. et al. (1960), "Continuous Signal Seismogram," *Geophysics*. 25(1), pp. 95-105.

* cited by examiner

LOW FREQUENCY SEISMIC ACQUISITION USING A COUNTER ROTATING ECCENTRIC MASS VIBRATOR

CROSS REFERENCE TO RELATED APPLICATION

This application claims the benefit of U.S. Provisional Patent Application 61/864,816, filed Aug. 12, 2013, entitled LOW FREQUENCY SEISMIC ACQUSITION USING A COUNTER ROTATING ECCENTRIC MASS VIBRATOR, the entirety of which is incorporated by reference herein.

FIELD OF THE INVENTION

This disclosure relates generally to the field of seismic prospecting in land and marine settings, and more particularly to acquisition of seismic data. Specifically, the disclosure describes an apparatus and method for seismic vibrator operation producing large forces at low frequencies (1-5 Hz).

BACKGROUND OF THE INVENTION

Seismic prospecting as practiced for the purpose of hydrocarbon (and mineral) exploration is primarily interested in backscattered, or reflected, waves from the earth's subsurface. The method of active seismic exploration uses seismic sources, at or near the surface of the earth (in the case of land seismic prospecting) or the sea (in the case of marine seismic prospecting), to excite seismic waves that propagate down into the earth. The waves encounter impedance changes in the earth and are reflected or scattered. Some of the waves propagate back to the surface where sensors (or receivers) record their amplitudes and times of arrival. The recorded data are then used to determine structure and physical properties of the earth's subsurface.

A major challenge in the modern practice of active seismic exploration is limits in the range of frequencies that can be implemented. The larger the frequency range that can be implemented, the more information that is obtained and can be used for improved determination of structure and physical properties of the earth's subsurface. For example, frequencies below the range presently implemented by modern practice have been long desired for improved seismic inversion. The primary obstacle has been the lack of practical seismic sources that can excite seismic waves into the earth at these frequencies. In spite of many decades of efforts to resolve this problem, there remains considerable room for advancements in seismic source concepts and technologies that can improve active seismic exploration method at theses frequencies.

Many types of seismic sources are commonly used in seismic prospecting. Some source types consist of charges of gun powder, dynamite, or other chemical explosives that releases short bursts of energy. In the marine setting, air-guns are often used to release a volume of compressed air into the water, which forces the surrounding water and excites a seismic wave. Other source types use mechanical means to impart an oscillatory force with controlled characteristics, such as force level and frequency, on the earth or in the water.

In all cases, seismic sources have characteristics and limitations that govern their utility for seismic prospecting. Among the more important characteristics is the force output a source generates, and how the force output varies at different frequencies. Most sources can impart a force sufficiently large over some certain range of frequencies to excite seismic waves at those frequencies that can travel through the earth, reflect or scatter off impedance changes in a region of prospecting interest in the earth's subsurface, and travel back to the surface with sufficient amplitude to be measured by sensors (or receivers). That certain range of frequencies can be referred to as the seismic bandwidth. However, outside that certain range of frequencies, there is either no force output, or the force output is too small to excite a seismic wave with sufficient amplitude to be measured by the sensors (or receivers).

A source frequently used in land seismic acquisition is the seismic vibrator. The modern seismic vibrator rests a baseplate on the ground, and uses hydraulic actuators connected to the baseplate and an inertial mass to drive an oscillatory displacement between them. FIG. 1 is a schematic representation of a seismic vibrator showing a baseplate 101, a hydraulic actuator 102, and an inertial mass 103. The hydraulic actuator contains a cylinder 106 that houses a piston 104. The piston is rigidly connected to the baseplate 101. A hydraulic system forces hydraulic fluid through valves 105 to the cylinder thereby modulating the displacement of the mass relative to the baseplate. Considering the case where the baseplate is relatively immobile (i.e., the "clamped force" case) the force to accelerate the inertial mass in an oscillatory motion described by $$x = d\cos(2\pi f t), \quad [1]$$

where x is the motion of the mass, d is the maximum displacement of the mass from a center position, f is the frequency of motion, and t is the independent variable of time; is given by the product of mass and acceleration (that is, second derivative of motion), $$F = m\ddot{x} = -md4\pi^2 f^2 \cos(2\pi f t), \quad [2]$$

where F is the force and m is the mass of the inertial mass. [In reality, the baseplate does move somewhat; those skilled in the art can compute the force knowing the accelerations and masses of the inertial mass and baseplate. The clamped force description is given here for simplicity.] The reaction force generated by acceleration of the inertial mass is transferred to the baseplate and imparts an oscillating force to the ground. The oscillating ground force excites seismic waves.

The oscillating force imparted on the ground and how it varies over time can be called a sweep or ground force sweep or a controlled sweep. In practice, a sweep is usually more complicated than a simple cosine function, but still oscillatory in nature, and approximately cosine locally in time. Sweeps can typically be a few seconds long or longer, and have variation in the frequency and magnitude of oscillation of the ground force (the magnitude of oscillation of the ground force sometimes called the magnitude or envelope of the ground force, or just the ground force) over the duration of the sweep. An operator, or sweep control system, can independently change the frequency and the magnitude of ground force. For example, an operator or sweep control system may change the frequency while keeping the ground force unchanged during some portion of the sweep, or may change the ground force while keeping the frequency unchanged, or a combination of changing frequency while changing ground force, or keeping ground force unchanged while keeping frequency unchanged. The sweep so implemented can be referred to as a "controlled sweep". Oftentimes, the sweep is pre-programmed, and the sweep control system will implement the sweep upon command by the operator or by radio control. There are many models of land vibrators used commercially in seismic prospecting today. Many popular models are rated to provide up to 275 kN of ground force at frequencies between 5 Hz and 250 Hz. Some of the largest models are rated to provide up to 400 kN of ground force at frequencies between 5 Hz and 250 Hz. Forces in the range of about 275 kN to 400 kN may be referred to as "large forces".

Another important feature of seismic vibrators for commercial applications in seismic prospecting is mobility. Modern seismic vibrators can move between locations, so as to be able to do one or more controlled sweeps at a location, then move to another nearby location and do one or more controlled sweeps, and so on throughout a seismic survey area. A modern seismic acquisition program will often excite seismic waves at many thousand locations, or source stations. A source that moves quickly and efficiently between source stations is more practical.

An important limitation of modern seismic vibrators used in seismic prospecting is the force output at low frequencies. The devices can typically provide the maximum rated force only to frequencies down to about 5 Hz. At this point, the hydraulic actuators reach their maximum displacement capability, typically less than about 5 cm from a center position, i.e., a total stroke less than about 10 cm. Because the displacement is at the maximum, and cannot be further increased as frequencies are lowered, the force output falls with the square of the frequency. Hence the seismic vibrator rated to provide a force of 400 kN down to 5 Hz may only be able to provide a force of 100 kN at 2.5 Hz, a force of 25 kN at 1.25 Hz, and a force of 16 kN at 1 Hz. The small forces may not be adequate for seismic prospecting at these lower frequencies. One way to compensate for smaller forces is to sweep for much longer durations. However, longer duration sweeps increase the time required to conduct a seismic survey, and correspondingly increases the cost. A solution that is more effective and less costly may be to increase the force output capability of seismic vibrators at low frequencies.

In addition to seismic vibrators, it is also widely known, at least empirically, that seismic sources of all types used commercially in the seismic prospecting industry, including air guns used in marine seismic prospecting, tend to follow similar trends, substantially losing force output as the frequency falls below about 5 Hz. While it is generally accepted that seismic prospecting above 5 Hz is well practiced and established, frequencies lower than 5 Hz become more difficult, and frequencies near 1 Hz are not successfully achieved in modern seismic prospecting. Frequencies below 5 Hz and including 1 Hz can be referred to as the "low frequencies."

The potential value low frequencies may contribute in seismic prospecting has been known for many decades. The seismic prospecting industry can greatly benefit from improvements in low frequency capabilities. One way to improve seismic prospecting at low frequencies is to develop a seismic source that can generate large forces at low frequencies. An example would be a seismic source that can produce forces in the range of about 275 kN to 400 kN at frequencies below 5 Hz and including 1 Hz. The present invention satisfies this need.

SUMMARY OF THE INVENTION

This disclosure describes an apparatus and method for seismic prospecting using counter-rotating eccentric-mass vibrator technology adapted as sources for seismic prospecting that can produce controlled sweeps, as in the manner used in modern seismic prospecting, but with large forces at low frequencies. Such seismic sources enable improved seismic prospecting at low frequencies, including frequencies below the frequency band normally obtained with existing commercial technologies used in the seismic prospecting industry. The acquired data may be used to determine structure and physical properties of the subsurface.

A low frequency range for which the present invention is particularly needed and therefore may be considered to be particularly advantageous is 1-5 Hz. From Eqn. [2], it may be seen that a figure of merit for producing a given level of ground force at a given frequency, is the product of mass times displacement times frequency squared (m d f$^2$). A CREMV of the present invention, in order to produce a ground force consistent with that which current vibrators provide at higher frequencies, preferably is designed and operated, according to the disclosures herein, such that the figure of merit for 1 Hz<f<5 Hz is greater than 1000 kg m s$^{-2}$, more preferably at least 7,000-10,000.

In one embodiment, the invention is a seismic vibrator comprising: an actuator comprising two oppositely rotating, adjustably eccentric masses; a motor powering the actuator, controlling the rotation frequency; and an eccentricity adjustment system adapted to change eccentricity while the actuator is operating, whether or not the rotation frequency is simultaneously being changed, and independent of any change in rotational frequency.

In another embodiment, the invention is a method for seismic prospecting or other subsurface structure determination, comprising: (a) constructing or obtaining a counter-rotating, adjustably eccentric, mass actuator (CREM), wherein the center of mass of each rotating mass at maximum eccentricity moves through a total stroke of at least 100 cm; (b) mounting the CREM on a rigid structure to make a seismic vibrator; and (c) operating the seismic vibrator, comprising: (i) continuously varying rotational frequency according to a selected ground force sweep signal, including frequencies ≤5 Hz; and (ii) adjusting eccentricity as the rotational frequency is varied to provide a downward force as a function of frequency and time corresponding to the selected ground force sweep signal.

BRIEF DESCRIPTION OF THE DRAWINGS

The present invention and its advantages will be better understood by referring to the following detailed description and the attached drawings in which.

Figure 1:
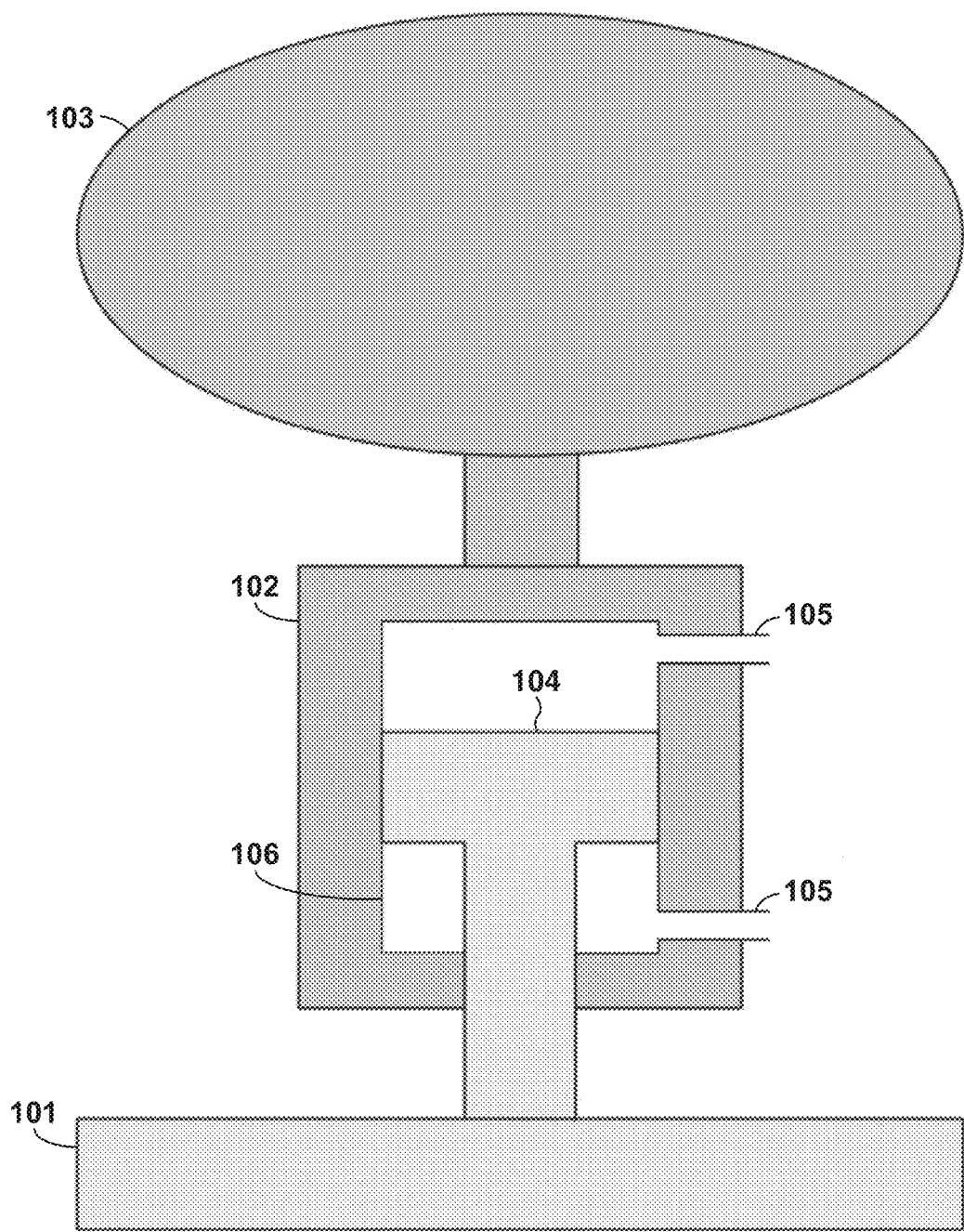
FIG. 1 is a schematic diagram illustrating the traditional hydraulic seismic vibrator.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

A seismic source capable of producing large forces at low frequencies requires an actuator capable of generating large forces at low frequencies. Such an actuator might be adapted, and incorporated with other important features common to seismic prospecting applications such as controlled sweep and mobility, for use as a seismic source. An important actuator technology that can be adapted to serve this purpose employs counter-rotating eccentric-masses. A rotating eccentric mass can be viewed as a mass at the end of an arm, the other end of the arm attached to a rotating axis. Hence the mass is rotating in a circle about the axis, held in place by the arm. A set of counter-rotating eccentric masses includes a system of two (or more) eccentric masses, each rotating in a direction counter to the other. Counter-rotating eccentric-masses may be designed, and attached to a rigid structure, such that the center of mass of the two (or more) rotating masses traces a rectilinear path thereby generating a net force with oscillating amplitude that is parallel and antiparallel to the rectilinear path. A counter-rotating eccentric-mass vibrator (CREMV) can be constructed in this way. CREMV's are commercially available for applications such as pile driving, and some have been constructed for testing structures such as buildings and bridges. None of these have been adapted for seismic exploration, e.g. controlled sweeps, and if they were somehow adapted, they would still have the problem of decreasing force at lower frequencies.

An actuator composed of counter-rotating eccentric-masses has important distinguishing characteristics from a hydraulic actuator (such as used commonly in modern seismic vibrators). Some characteristics of counter-rotating eccentric-mass actuators give them inherent advantages over hydraulic actuators for certain purposes. (The reverse is also true for other purposes.) Of particular interest is the inherent advantage an adapted counter-rotating eccentric-mass actuator has over hydraulic actuators for generating large forces at low frequencies. This is accomplished by moving large masses through large displacements. For counter rotating masses such as 201 and 202 in FIG. 2, displacement of the system center-of-mass is equal to the radius of rotation of the center-of-mass of either mass, and the total stroke is equal to twice the radius of rotation of the center of mass. Center-of-mass displacements of one to two meters, or more, are practical. (Correspondingly, a hydraulic actuator's maximum displacement typically does not exceed 5 cm, or a stroke of 10 cm.) Like a mass attached to the end of a spring, or the mass attached to the hydraulic actuator in a conventional vibrator, the counter-rotating eccentric-mass actuator is a harmonic oscillator. In other words, for all three systems, the motion of the system center of mass will be rectilinear and sinusoidal in time, and the relationship between force, frequency, and maximum displacement, is given by Eqn. (2). Thus, the force generated by oscillating displacement of masses is proportional to the mass, proportional to the displacement, and proportional to the frequency-squared. So, a given force can be maintained for an octave drop in frequency by quadrupling the displacement. Because counter-rotating eccentric-mass actuators can create displacements more than an order magnitude greater than hydraulic actuators, and can practically operate at low frequencies, a key aspect of the present invention is that their large displacements, achievable by eccentricity adjustments, can be used to offset the effect of frequency-squared dependence to enable a large force at low frequencies.

Figure 3:
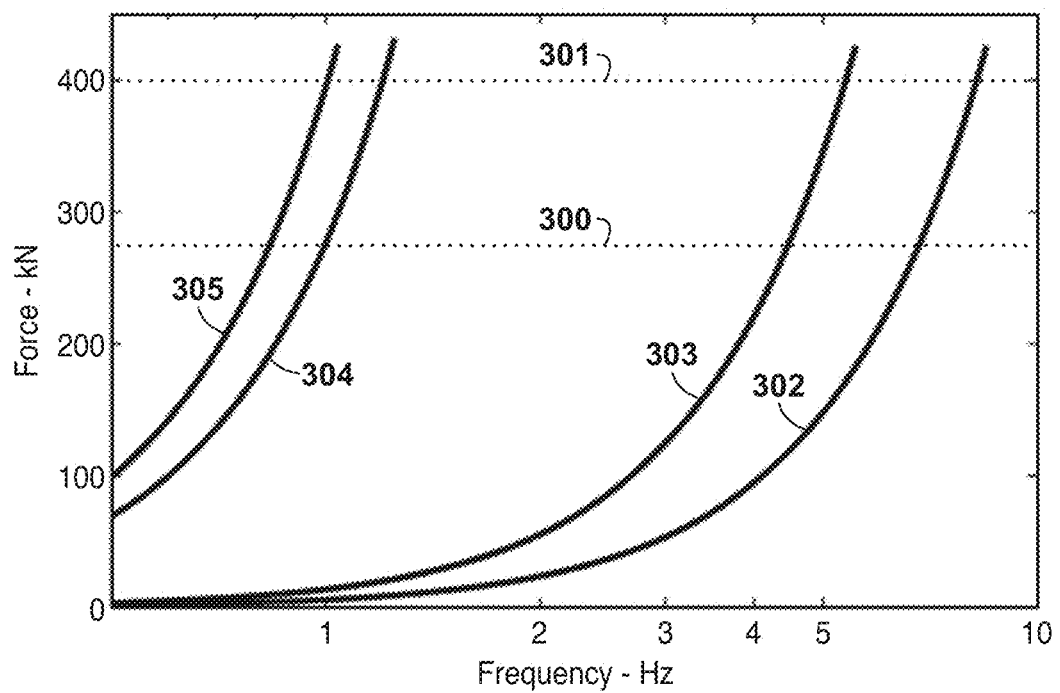
FIG. 3 shows that the maximum forces achievable with CREMV actuators are much higher at lower frequencies than those achievable with hydraulic actuators.

To illustrate the advantage that a CREMV, adapted in the manner of this invention, can have over a hydraulic vibrator, especially at low frequencies, FIG. 3 shows the maximum forces at low frequencies, up to about 400 kN, that are possible to achieve from the two types of devices according to equation 2. Many commercial hydraulic vibrators commonly available for seismic prospecting have an inertial mass of about 4000 kg, and a maximum stroke of about 7.6 cm. (that is maximum displacement of about 3.8 cm). The product of inertial mass and maximum displacement (or "md product") can be used to conveniently characterize vibrators. In this case, the md product is about 150 kg-m. The maximum force output of a device with an md product of 150 kg-m is shown in FIG. 3 (302). Some of the largest hydraulic vibrators in commercial use, though not as widely available, can have md products as high as 350 kg-m. The maximum force output of a device with an md product of 350 kg-m is shown in FIG. 3 (303). These vibrators are capable of producing large forces at frequencies above 5 Hz., but their force output falls rapidly for frequencies below 5 Hz. Dotted lines are shown to represent large force levels of 275 kN (300) and 400 kN (301). The corresponding and product of the present invention, a CREMV adapted to produce large forces at low frequencies, can be as high as 7000 kg-m to 10,000 kg-m. The increased and product is accomplished primarily by substantially increasing displacement, even by more than an order of magnitude, over hydraulic vibrators. The maximum force output of a device with and products of 7000 kg-m (304) and 10,000 kg-m (305) are shown in FIG. 3. In these cases, large forces can be produced for frequencies below 5 Hz and down to and including 1 Hz. This shows the advantage an adapted CREMV has over hydraulic vibrators for producing large forces at low frequencies, and for enabling seismic prospecting at low frequencies.

CREMV technology has been used in various applications for many decades. The technology can be used for producing vibrations for a large range of frequencies, not just large forces at low frequencies. For example, the first seismic vibrators used counter-rotating eccentric-mass actuators to produce ground forces in the conventional seismic frequency band. These seismic vibrators were designed as a replacement for dynamite as the energy source (Crawford, Doty, and Lee, "Continuous Signal Seismogram," Geophysics 25, 95-105 (1960)). CREMV style actuators have also recently been proposed for use in boreholes to excite seismic waves at higher frequencies; see Kamata, U.S. patent application publication 2012/0145476, discussed below. Devices such as these were not designed to produce large forces at low frequencies, possibly because their creators did not recognize the potential of CREMV technology to move large masses through large displacements thereby enabling large forces at low frequencies. Though the earliest seismic vibrators utilized counter-rotating eccentric-mass actuators to excite forces, the actuators were eventually replaced with hydraulic actuators allowing improved operation and control in the frequency band of interest. Hydraulic actuators are presently the widely accepted industry standard for seismic vibrators.

CREMV technology is also used extensively in construction and testing of man-made structures. Vibratory hammers use the technology to produce forces for applications such as pile driving. They usually operate at or about 20 to 40 Hz. CREMV technology is also used for field testing of structures. In this case, a CREMV is attached to structures or equipment to determine their response to different frequencies, and search for resonances that could be damaging if naturally excited. Structures such as building foundations, ships, bridges, dams, storage tanks, and others can be tested this way. These applications often employ operations at or near steady state or one constant frequency at a time. They also may not need to be particularly large forces since man-made structures are relatively small compared to the earth. Exciting such structures can require much less force than exciting seismic waves of sufficient amplitude for seismic prospecting applications.

Eccentric mass vibrator technology has been used for civil engineering and earthquake seismology applications. Some examples are given by Alekseev et al., "Powerful low-frequency vibrators for active seismology," Bulletin of the Seismological Society of America 95, 1-17 (2005). A few eccentric-mass vibrators and several applications are described. The largest described vibrator is designed to produce a maximum force of 100 tons. Assuming the meaning is metric-ton, this force is equivalent to 981 kN (or 890 kN if the meaning is short-ton). It is a stationary device, permanently located at one site, that can be adjusted to one of three different eccentricities. The three eccentricity configurations correspond to operation in one of three frequency bands, 1.5-3 Hz, 3-6 Hz, and 5-10 Hz. During operation, the eccentricity is fixed, so the force output is dependent on the square of the frequency at which it is operating. For example, the eccentricity setting for the lowest octave, 1.5-3 Hz, produces the largest force of 100 tons when operated at 3 Hz, and 25 tons when operated at 1.5 Hz.

The counter-rotating eccentric-mass actuators described in various applications cannot be directly employed for seismic prospecting applications in the manner of modern seismic prospecting practices. For example, the devices described for civil engineering and earthquake seismology applications do not have the required features and characteristics needed for seismic prospecting applications at low frequencies. Though the 100 ton eccentric mass vibrator described by Alekseev can produce large forces (>275 kN) for frequencies between 1.6 and 3 Hz, and for frequencies between 3.2 and 6 Hz, it does not produce large forces for frequencies below 5 Hz and including 1 Hz. Furthermore, a reconfiguration of the device is required to operate at frequencies between 1.5-3 Hz and frequencies between 3-6 Hz. Reconfiguration of the source in order to operate more than one octave is impractical for seismic prospecting applications. Also, fixed eccentricity ties the force output to the square of the frequency, so does not enable controlled sweep capability. For controlled sweeps, the force cannot be limited to the square of the frequency. Rather, the ability must exist to specify the force and frequency, independently, over the duration of the sweep.

Seismic prospecting can benefit from seismic sources that can produce large forces at low frequencies, and have other features and characteristics common to controlled seismic sources for modern seismic prospecting practices, such as the ability to implement controlled sweeps and mobility. CREMV technology has an inherent advantage for producing large forces at low frequencies because it can be used to move large masses through large displacements, thus compensating for the frequency-squared effect on force that is detrimental at low frequencies. The technology may be adapted to develop a seismic source that can produce large forces at low frequencies and retain the features and characteristics useful for seismic prospecting, such as implementing a controlled sweep, so that it may be operated in the manner of modern seismic prospecting practices.

All of these prior CREMV devices, whether for seismic or other use, are fixed eccentricity devices, with the exception of the device proposed by Kamata. Other than Kamata's proposed device, these devices had no means for adjusting eccentricity on-the-fly, with or without simultaneous adjustment of frequency. In his paragraphs 94-95, Kamata describes a method that purportedly maintains force relatively constant "for a small range of rotational velocities." However, Kamata does not teach how to control both eccentricity (and therefore displacement, or amplitude) and frequency independently of each other, a key feature in the present invention. In the first sentence of paragraph 94, Kamata states, "In other embodiments, the movement of the net centers of mass may be automatic, for example, based upon the rotational velocity of the inner and outer masses." So, Kamata's eccentricity is tied to frequency. Consequently, his force output cannot be varied independently from the frequency. That means that for any given frequency (rotational velocity) that his inner and outer masses may operate at, only one force level output is possible. In the present invention, eccentricity can be controlled independently of the frequency. This allows the CREMV device of the present invention to effect controlled sweeps, i.e. it can realize any force at any given frequency, and vice-versa. Kamata acknowledges the embodiment of his FIGS. 11A-11D can produce a relatively constant force only "for a small range of rotational velocities" [paragraph 95]. In contrast, the present invention is capable of eccentricity control over a very large range of frequencies—between two and three octaves. Eccentricity must be altered as $1/f^2$ to maintain constant force—see Eqn. (2). It appears that Kamata's device is limited to a small range of frequencies because he is not able to vary eccentricity with frequency as $1/f^2$.

It appears that Kamata may obtain his automatic simultaneous adjustment of eccentricity with frequency by connecting the halves of his inner and outer counter-rotating masses with (see his FIGS. 11C-11D) a curved resilient member 711 coupled to a control mass 712, and thereby he is able to conform to a sweep whereby force is fairly constant over a small range of frequencies. Therefore, Kamata may be able to achieve a different frequency dependence for eccentricity by varying the spring constant of the resilient member 711 and/ or the mass of the control mass 712, but he would have to shut down, change 711 and 712, and then start up again. A typical desired sweep will require varying frequency dependence over the course of the sweep, which would be impossible with Kamata's proposed device.

The present invention is a method of low-frequency seismic prospecting that uses a seismic source consisting of counter-rotating eccentric-mass vibrator (CREMV) technology adapted to produce large forces at low frequencies in a controlled sweep. The invention can be used in both land and marine settings. A seismic source employing CREMV technology to produce large forces at low frequencies can be referred to as a CREMV seismic source. One aspect of the invention is a CREMV seismic source that is mobile and can implement controlled sweeps and excite seismic waves for seismic prospecting. One embodiment of the invention is a CREMV seismic source designed for seismic prospecting on land. Another embodiment is a CREMV seismic source designed for seismic prospecting in marine settings.

Figure 4:
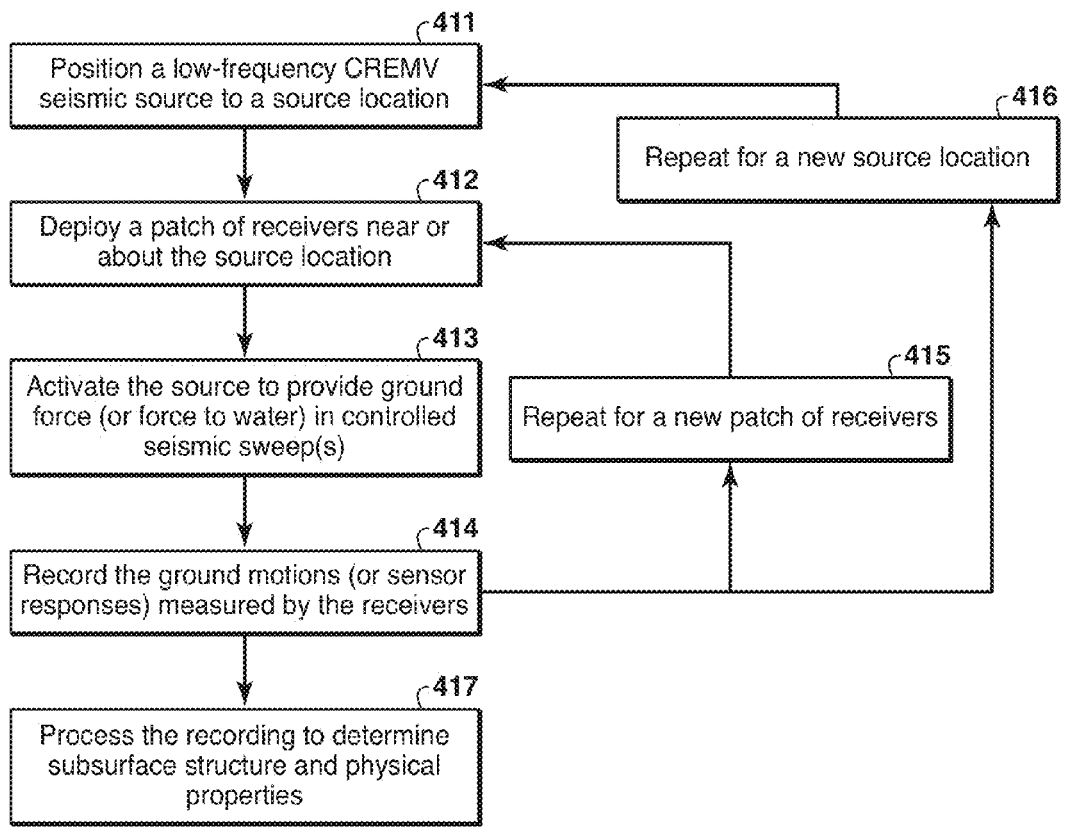
FIG. 4 is a flowchart that shows the basic steps in seismic surveying, where a CREMV source is used instead of a traditional seismic source.

FIG. 4 is a flow chart showing basic steps in conducting a conventional seismic survey, except for the use of a CREMV source which is not conventional. A CREMV seismic source, receivers, and recording system are deployed to an area in which the earth's subsurface is to be investigated. The receivers and recording system should be operable at the frequencies in which the CREMV seismic source is planned to operate; that is, the receivers should be able to measure at those frequencies, and the recording system should be able to record those frequencies. At step 411, the CREMV seismic source is positioned to a first desired source location. At step 412, which may occur prior to, simultaneous with, or following step 411, receivers are deployed near or about the source location in a manner in which to obtain the desired offsets and azimuths. At step 413, the CREMV seismic source is activated, and applies an oscillatory force to the ground (or water) according to a predetermined control sweep. The sweep may be repeated one or more times. Additional sweeps, different from the first sweep, may also be applied immediately following the first sweep, or after some time following the first sweep. The receivers measure ground motion or responses (such as pressure that hydrophones sense in a marine setting). The receiver measurements are recorded by the recording system (step 414). Once the recording is completed, the receivers may be deployed in a new pattern about the source and the process repeated (step 415), or the CREMV seismic source may be located to a new position, and the process repeated (step 416). The cycle is repeated until measurements and recordings have been completed for each of all planned or desired source locations. The recordings may then be processed to determine subsurface structures and physical properties (step 417).

There can be many variations on this example. For example, rather than a single CREMV seismic source, there may be several CREMV seismic sources positioned near each other, and they may operate in tandem thereby effecting an array of like-acting or similar-acting sources. In another variation, several CREMV seismic sources may be operated simultaneously, but independently from one another, such as in the method known as simultaneous-sourcing. One or more CREMV seismic sources may also be operated simultaneously with one or more other seismic sources, either as in an array or independently as in simultaneous-sourcing. Other practices employed in the art of seismic prospecting may also be implemented using a CREMV seismic source in place of, or in conjunction with, other seismic sources.

Figure 5:
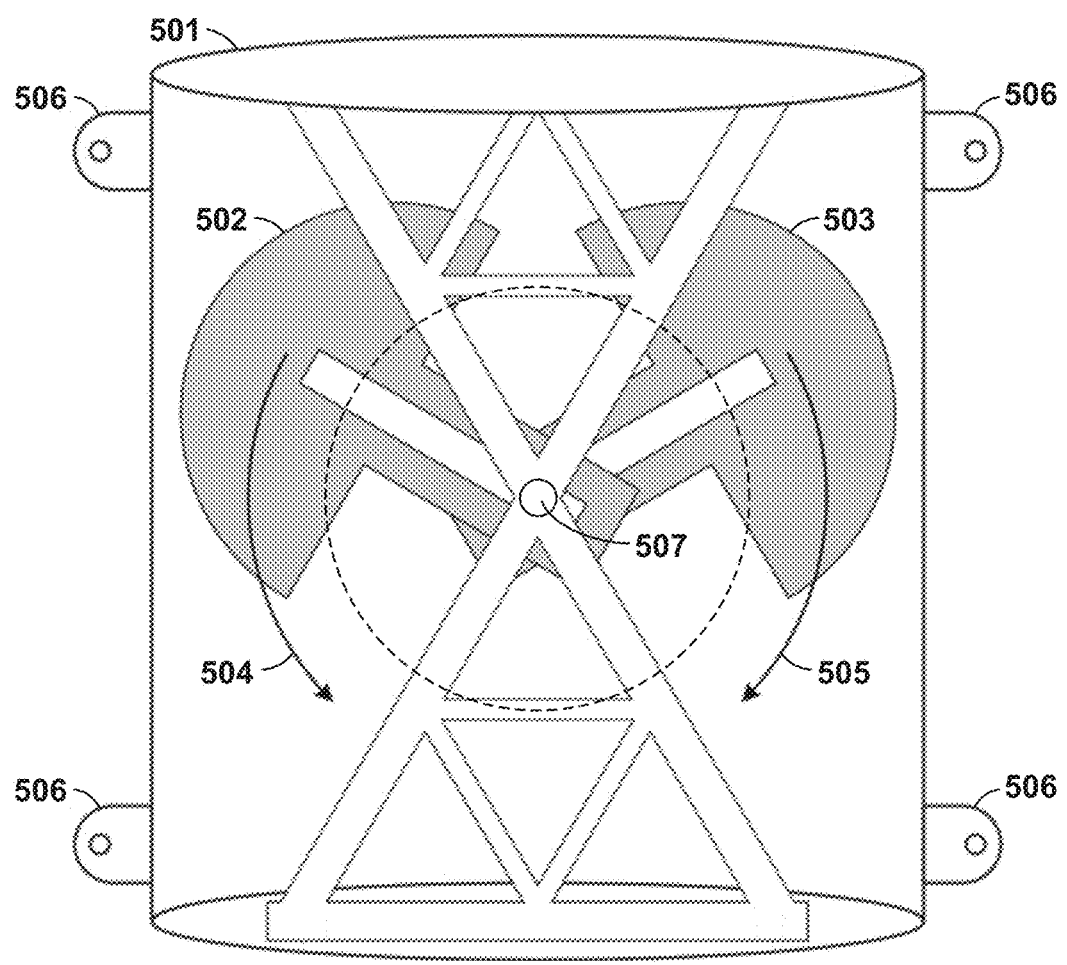
FIG. 5 illustrates a CREMV seismic source mounted inside a water-proof cylindrical canister for marine applications.

In another embodiment of the invention, an adapted CREMV actuator drives a dipole marine source, such as that described in the 2008 U.S. Pat. No. 7,377,357 to Duren and Meier, to generate low frequency seismic waves for marine seismic prospecting. The CREMV is rigidly mounted inside a rigid cylindrical shell. Driven by the CREMV, the cylinder forces the surrounding water thereby generating seismic waves. FIG. 5 is a schematic illustrating a CREMV seismic source mounted inside a water-proof cylindrical canister 501 for marine applications. In this case, the weights (502, 503) are mounted co-axially (507) and rotate in opposite directions (504, 505). The canister is submerged beneath the sea surface and can be vertically oriented. In this embodiment, the CREMV seismic source excites low frequency seismic waves with opposite polarities in the upward and downward directions, as in the manner described in the 2008 U.S. Pat. No. 7,377,357 to Duren and Meier. The canister may be fitted with fixtures 506 that allow (a) suspension from sea surface floats, (b) weighting suspended from the bottom to assist in maintaining vertical orientation, and (c) tow ropes and other rigging as may be needed to tow from a marine vessel and maintain stability of the enclosure as it tows through the water. The marine source is towed by a seismic source vessel. The same vessel may also tow one or more seismic streamers that contain sensors to measure the wavefield, or a second vessel may be used to tow the streamers. Alternatively, sensors or receivers may be placed on the ocean bottom, as in ocean bottom cables or ocean bottom nodes.

A key aspect of the invention is the adaptation of counter-rotating eccentric-mass vibrator (CREMV) technology to produce large forces at low frequencies in a controlled sweep for seismic prospecting applications. A seismic source employing CREMV technology to produce large forces at low frequencies can be referred to as a CREMV seismic source. A CREMV seismic source preferably has several key capabilities for application to seismic prospecting. Perhaps the most important capability is the implementation of controlled sweeps in which the frequency and force may be changed independently. One way to achieve this capability is by implementing means to independently change the rotational frequency of the masses and the eccentricity of the masses. This requires the ability to vary the mass eccentricity on-the-fly, and simultaneous ability to vary the rotational frequency of the masses.

The manner in which eccentricity must be varied in order to implement a desired ground force sweep can be obtained from consideration of the force equation for counter rotating eccentric masses. A common means to specify a ground force sweep is providing a magnitude or envelope of the ground force as a function of time of sweep (represented by A(t)) and a frequency as a function of time of sweep (represented by f(t)). Then the equation for the ground force sweep as a function of time of sweep (represented by F(t)) is given by $$F(t)=A(t)\cos(2\pi f(t)t+\theta) \quad [3]$$

where θ represents a preferred phase reference, which may be assumed zero for simplicity. For a CREMV seismic source, the ground force magnitude or envelope depends on both the rotational frequency of the eccentric masses, which is the same as f(t), and the eccentricity (represented by e(t)) according to the relationship $$A(t)=4\pi^2 f^2(t)e(t) \quad [4]$$

So, the time-variable eccentricity that needs to be implemented on-the-fly and during the sweep is determined from the frequency and magnitude or envelope of the ground force provided to specify the ground force sweep, according to the equation $$e(t) = \frac{A(t)}{4\pi^2 f^2(t)} \quad [5]$$

A means to implement the determined time-variable eccentricity is needed for a CREMV seismic source. Eccentricity is given by the product of mass (represented by m), and radius of rotation of the center of mass (represented by r(t))

$$e(t) = mr(t) \quad [6]$$

In this representation, the mass is treated as invariable during the time of sweep, whereas the radius is treated as variable with the time of sweep. As an example, for a CREMV seismic source consisting of two counter rotating eccentric masses, each rotating the same amount of mass at the same radius of rotation, then r(t) is that radius of rotation of the center of mass for each mass, and m is the summation of the two counter rotating masses. In this case, the radius of rotation of the center of mass of each mass needs to be adjusted on-the-fly during the sweep according to $$r(t) = \frac{1}{m} \frac{A(t)}{4\pi^2 f^2(t)} \quad [7]$$

By implementing this control of the radius of rotation, and implementing the rotational frequency, the desired ground force sweep is achieved using a CREMV seismic source.

In another example, the desired ground force sweep may be specified directly, without providing a magnitude or envelope of the ground force as a function of time of sweep and a frequency as a function of time of sweep. In this case, there are means to determine the magnitude or envelope of the ground force as a function of time of sweep and the frequency as a function of time of sweep from the specified ground force sweep. These may then be used to determine the eccentricity and/or the radius of rotation, and the rotational frequency needed to implement the specified ground force sweep using a CREMV seismic source. For example, given the ground force sweep, the magnitude or envelope of the ground force as a function of time of sweep can be determined by $$A(t) = \sqrt{F^2(t) + H^2(t)} \quad [8]$$

where H(t) is the Hilbert transform of F(t) [see for example Bracewell, "The Fourier Transform and Its Applications", $2^{nd}$ Edition, pp. 267-272 (1978)]. The rotational frequency may be determined by $$f(t) = \frac{1}{2\pi} \frac{d}{dt}\left(\tan^{-1}\left(\frac{-H(t)}{F(t)}\right)\right) \quad [9]$$

From these determinations, the eccentricity and/or radius of rotation during the time of sweep needed to implement the specified ground force are obtained by application of equations [5] and/or [7]. Those skilled in the art may apply other means to determine A(t) and f(t) given F(t). Once obtained by a preferred means, A(t) and f(t) may be used to determine the eccentricity and/or radius of rotation that is needed to implement the specified ground force sweep, by application of equations [5] and/or [7]. The module or unit that performs the computations using the foregoing equations or their equivalent may be called the sweep controller. The sweep controller may include a computer or central processing unit and one or more servo mechanisms.

In addition to determining the eccentricity and/or radius of rotation that is needed to implement the specified ground force sweep, a mechanical means to implement controlled variation of the eccentricity and/or radius of rotation so determined is needed. Example embodiments are described later in this application. Key aspects of the present invention is determination of the eccentricity and/or radius of rotation of the center of mass, as a function of the time of sweep, that is needed to implement a desired ground force sweep using a CREMV seismic source, and a mechanical means to implement that eccentricity and/or radius of rotation of the center of mass on-the-fly and in an independently controlled manner.

Figure 6A:
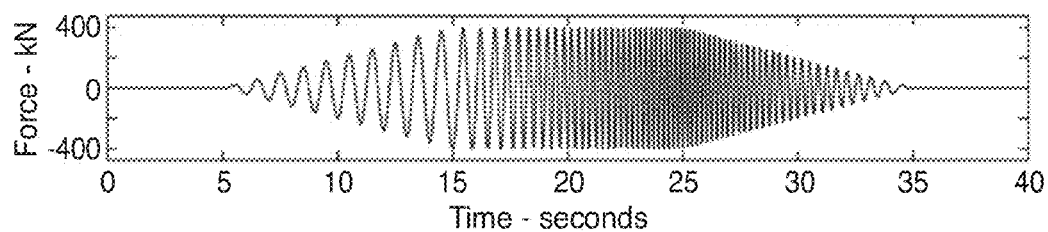
FIGS. 6A, 6B, and 6C show an example sweep, corresponding ground force magnitude or envelope, and cosine of the corresponding angle of rotation.
Figure 6B:
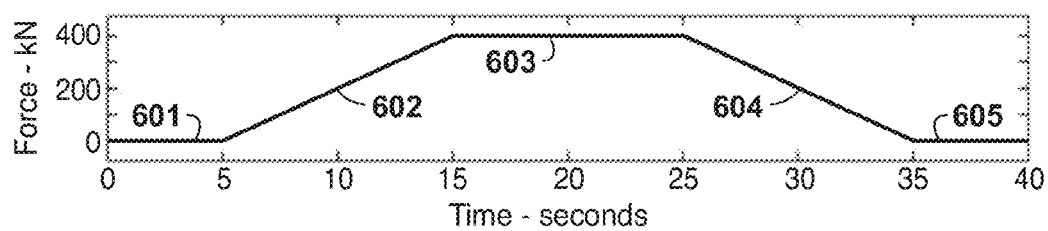
Figure 6C:
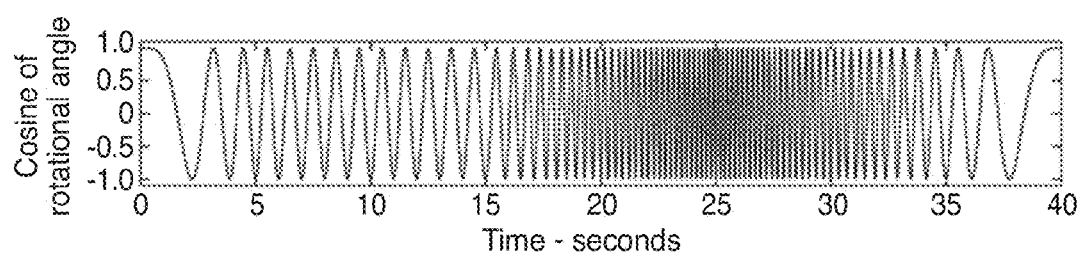

An example can be described using the sweep shown in FIG. 6A and the corresponding force magnitude and cosine of angle of rotation in FIGS. 6B and 6C. The plot of cosine of the angle of rotation helps to visualize the changing frequency of rotation over time—see Eqn. [3]. The sweep consists of five segments in which force and frequency must be controlled independently. In the first segment, between zero and five seconds (601), the CREMV starts from a rest position with the eccentricity at or near zero so that little or no force is output. The eccentricity, and consequently the force, is kept at or near zero while the rotational frequency is linearly increased from 0 Hz at the start, or 0 seconds, to 1 Hz at 5 seconds. Hence the frequency is changed while the force (and eccentricity) is kept unchanged at or near zero kilo-newtons (kN). In the second segment, from 5 seconds to 15 seconds (602), the frequency is kept constant at 1 Hz, while the force is linearly increased from 0 to 400 kN. This requires that the eccentricity of the masses is changed while the rotational frequency stays unchanged so that the force output increases linearly over the duration of this segment. The force produced by a CREMV device is proportional to the eccentricity and the square of the frequency. So, with unchanging frequency, the eccentricity is increased linearly during the segment in order to increase the force linearly during the segment. In the third segment, from 15 seconds to 25 seconds (603), the force is kept unchanged at 400 kN during the segment, while the frequency is increased linearly from 1 Hz at the beginning of the segment to 5 Hz at the end of the segment. Because a constant force is desired while the frequency is increased, the eccentricity must be decreased with the inverse square of the frequency in order to keep the product of eccentricity and frequency-squared constant (thereby keeping the force constant). In the fourth segment, from 25 seconds to 35 seconds (604), the force is decreased linearly during the segment from 400 kN at 25 seconds to 0 kN at 35 seconds while the frequency is decreased from 5 Hz at 25 seconds to 1 Hz at 35 seconds. In this case, both the eccentricity and the frequency must be changed simultaneously in a manner to realize the linear decrease in force. For the final segment, from 35 seconds to 40 seconds (605), the force (and eccentricity) stays at zero while the frequency of the rotating masses is reduced from 1 Hz at 35 seconds to 0 Hz (i.e., stop) at 40 seconds.

Figure 2:
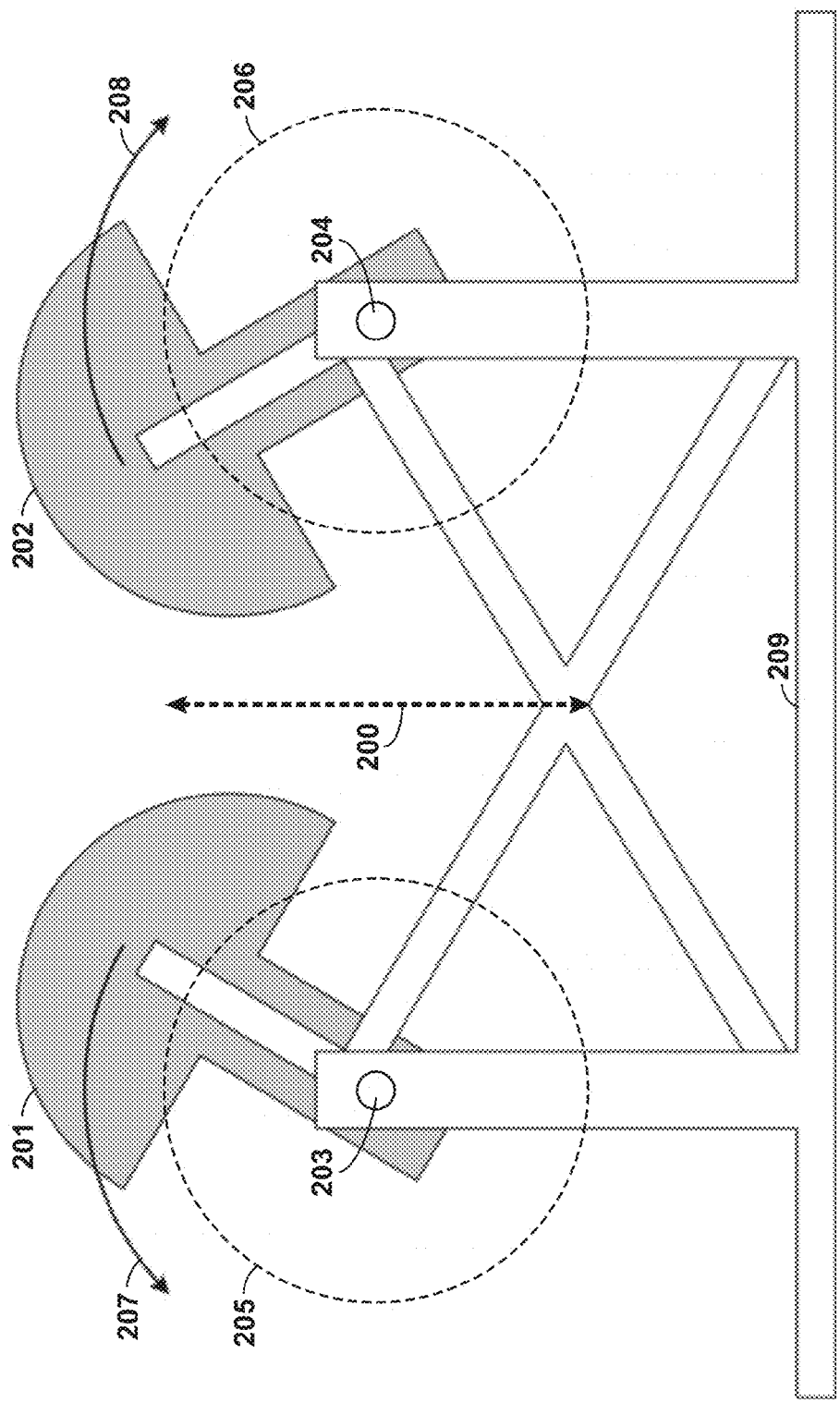
FIG. 2 is an example of a counter rotating eccentric mass vibrator (CREMV) adjusted to full eccentricity.

FIG. 2 shows an example of a CREMV at full eccentricity. In this case, each of two weights 201 and 202 is extended from its respective axis of rotation 203 and 204 so that the center of mass is far-most from the axis, and moves about the axis in a circular orbit 205 and 206 as the weight rotates. A fundamental aspect of CREMV design is that one weight rotates in the opposite direction from the other; for example, if one weight rotates in a counter-clockwise sense (207), then the other weight rotates in a clockwise sense (208). The result is that the center of mass of the combined system of weights moves in a vertical rectilinear fashion 200, as a sinusoidal function of time, at a position midway between the two axes of rotation, and with length equal to twice the radius of the circular orbit of either of the individual weights. The weights are attached to two rotating shafts, respectively, that rotate the weights about their axes of rotation. The shafts are supported by bearings mounted in a rigid structure 209, and are free to rotate. Each shaft may have pulleys rigidly attached, and belts driven by motors or by drive shafts may turn the pulleys, causing the shafts to turn, and causing the weights to rotate. The net resultant force on the ground, or whatever the structure is standing on, is an oscillatory vertical force.

Figure 7:
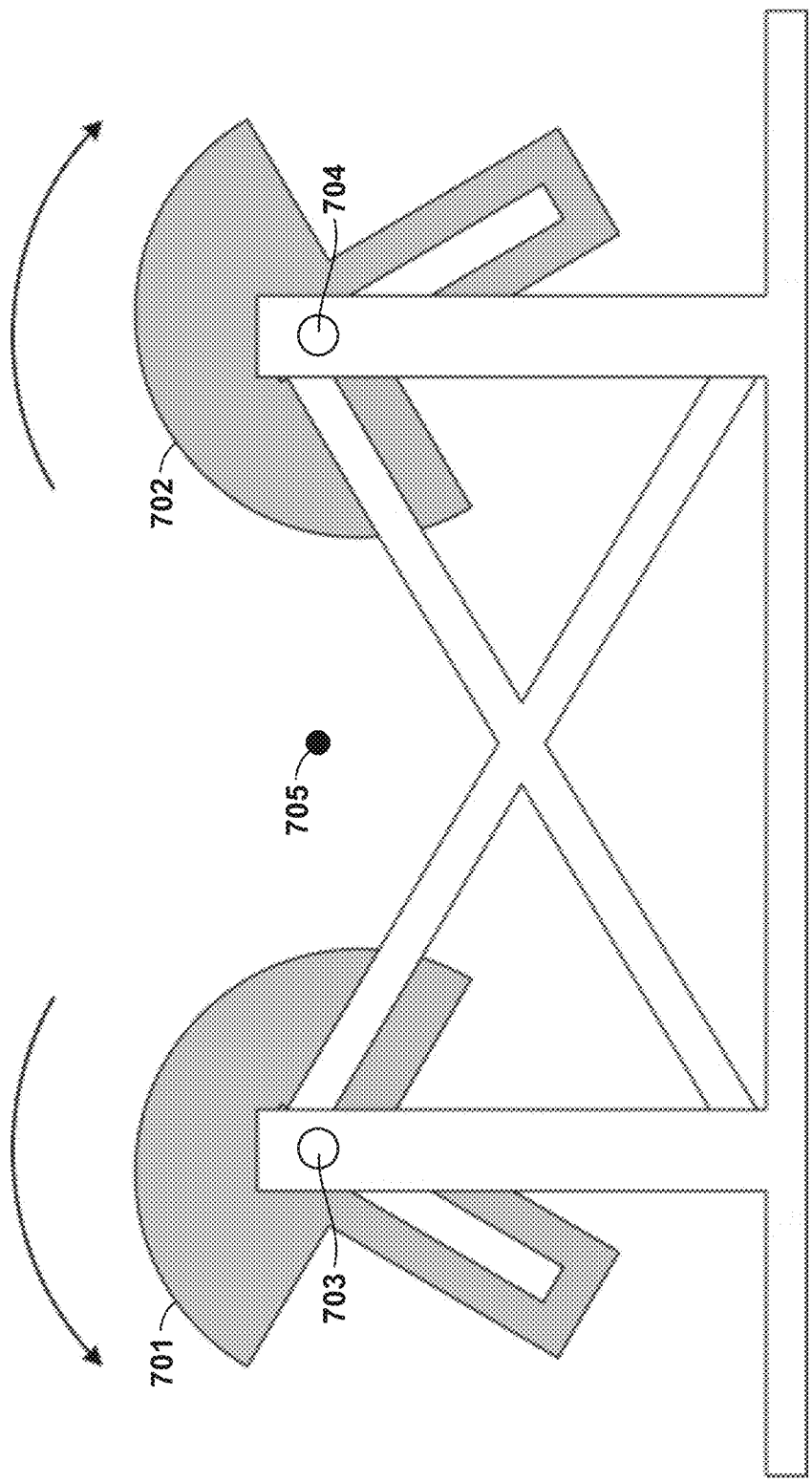
FIG. 7 shows an example of a counter rotating eccentric mass vibrator (CREMV) at or near zero eccentricity.
Figure 8:
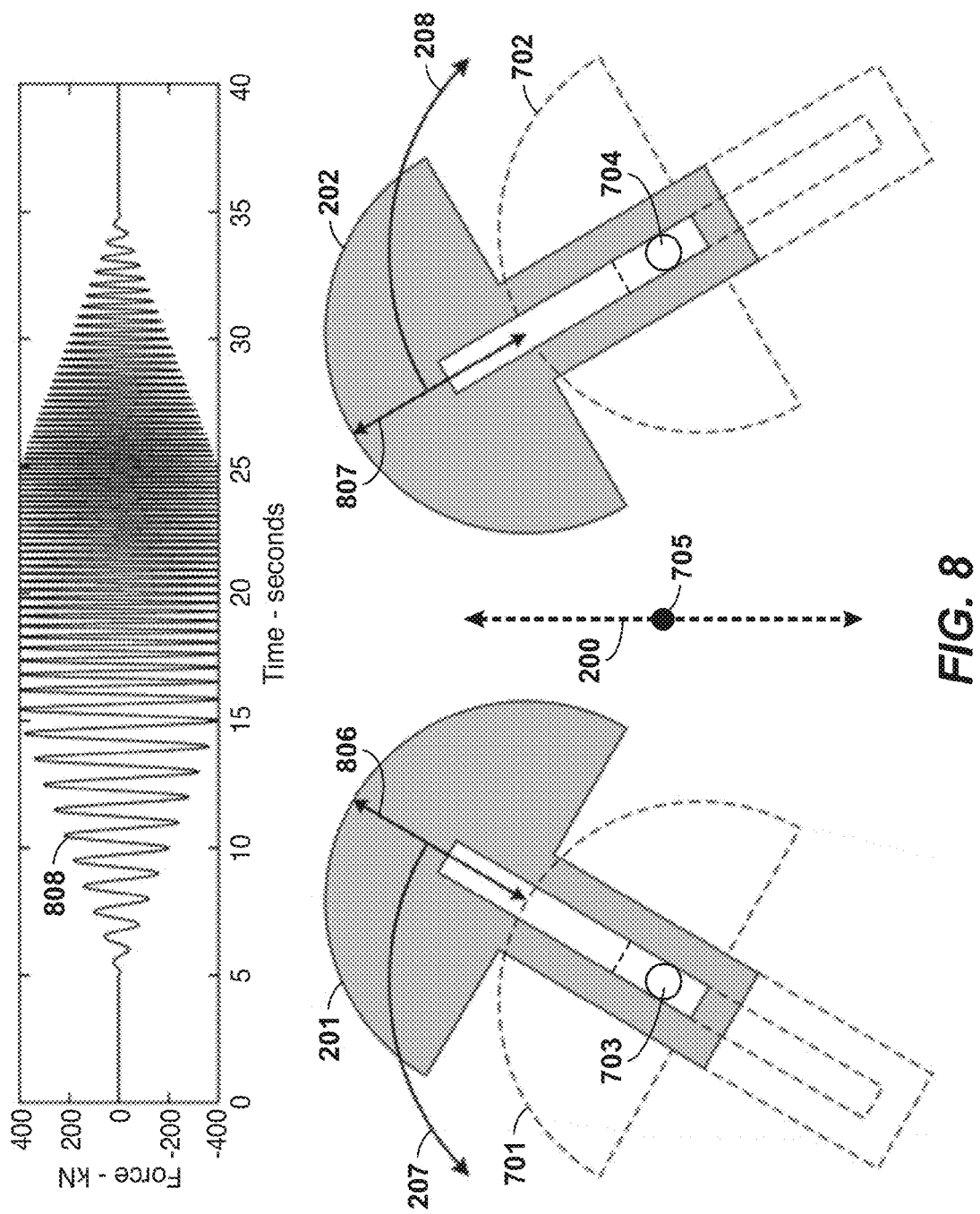
FIG. 8 shows how the masses of a CREMV may be adjusted radially while they rotate so that eccentricity and rate of rotation may be varied simultaneously and independently.

FIG. 7 shows an example of the same CREMV at or near zero eccentricity. In this case, each weight 701 and 702 is positioned so that its center of mass is collocated (or near) the axis of rotation (703 and 704), so does not move (significantly) as the weight rotates. Now, the center of mass of the combined system of weights is stationary at position 705 midway between the two axes of rotation. Because the center of mass is stationary, little or no net resultant force is created. The CREMV seismic source of the present invention is able to alter eccentricity on-the-fly during operation, in a controlled manner so as to maintain the force desired at any given moment of time, even as the rotational frequency may be changing according to the desired sweep. FIG. 8 illustrates a radial range of position the masses may be adjusted (806 and 807) while the masses rotate (207 and 208) enabling controlled and simultaneous variation of eccentricity and rate of rotation. The simultaneous control of eccentricity and rate of rotation is needed to produce a controlled sweep (808).

What is shown in FIG. 2, together with the motor that powers it (not shown), constitutes the actuator for the seismic source of the present invention, corresponding in function to the hydraulic actuator 102 and inertial mass 103 of the current seismic vibrator (FIG. 1).

Figure 9:
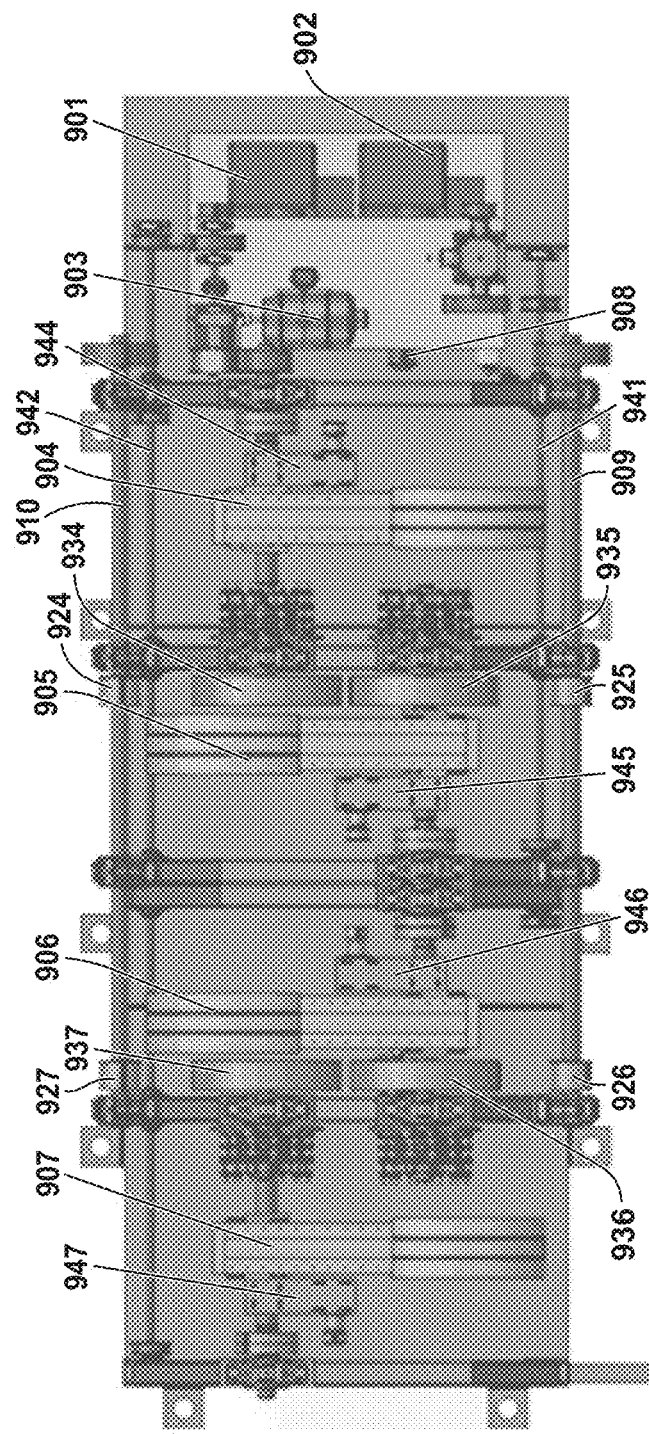
FIG. 9 is a top view of one embodiment of the present invention's adapted CREMV source for seismic applications, including the capability to vary mass eccentricity on-the-fly and simultaneously vary the rotational frequency.
Figure 10:
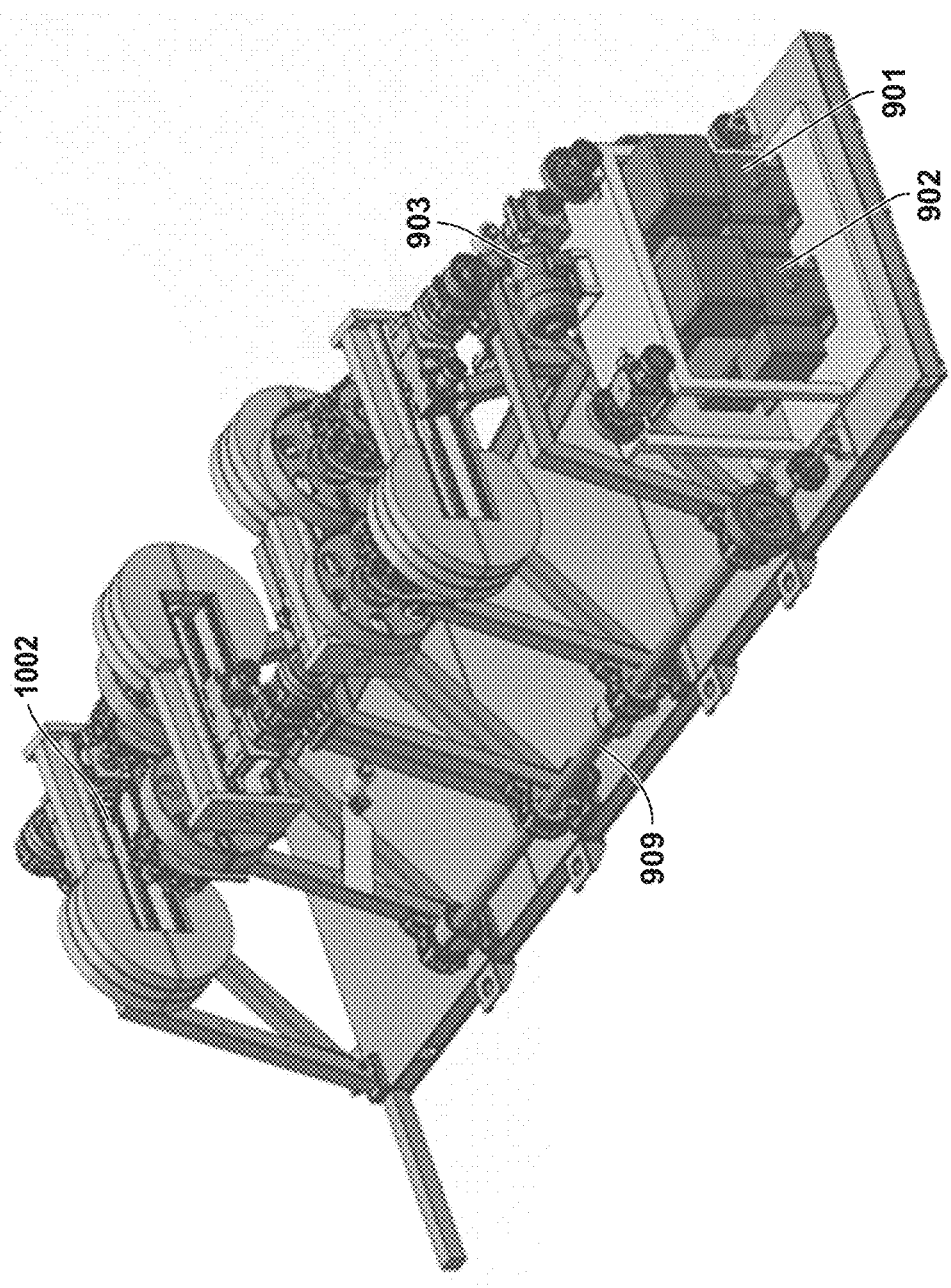
FIG. 10 is a perspective view of the adapted CREMV of FIG. 9.
Figure 22:
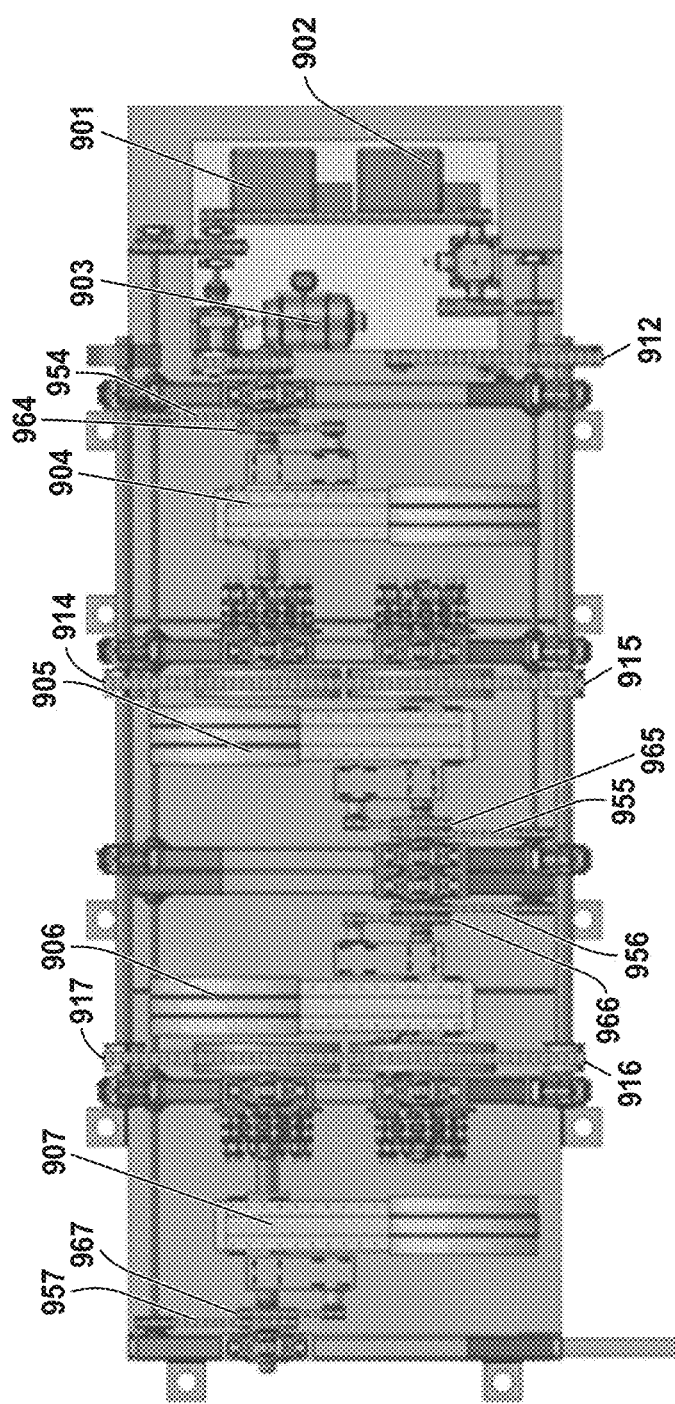
FIG. 22 is a top view, like FIG. 9, but showing several timing belts.

In one embodiment of the present invention, the adaptation of CREMV technology to produce large forces at low frequencies in a controlled sweep for seismic prospecting and other applications, including the ability to vary the mass eccentricity on-the-fly and simultaneously and independently vary the rotational frequency of the masses is shown in FIGS. 9-14. FIG. 9 shows a top view, and FIG. 22 shows the same view including several timing belts that are not shown in FIG. 9 for clarity. FIG. 10 shows a perspective view without belts. The eccentricity adjustment motor is shown at 903. Two identical but counter-rotating large motors (called the main motors 901 and 902) rotate four eccentric masses (904-907). One motor rotates two of the masses clockwise while the other rotates the other two masses counterclockwise. The direction of rotation of the inside two masses is opposite to the outside two masses. This alternation is used to prevent producing significant yaw force about the vertical axis, which would be the case if only two of the counter-rotating masses were used in the configuration shown. The motors are speed and phase synchronized to provide actions that mirror one another. Torque is transferred via timing belts (one of the two timing belts is shown (912) in FIG. 22) connecting the motor shafts (one of the two motor shafts is shown at 908) to the drive shafts (909 and 910), respectively, and timing belts (914-917) connecting the drive shafts (909 and 910) to the mass shafts (i.e. the shafts that turn the respective eccentric masses). FIG. 10 shows the eccentric masses supported by linear bearing rails and translated by roller screw 1002. FIG. 10 also shows one of the two main drive shafts (909).

The four eccentric masses are preferably identical, particularly each of the two masses in any counter-rotating pair. Variation in the rotational frequency of the eccentric masses is achieved by varying the rotational frequency of the drive shafts 909 and 910. The drive shafts (909 and 910) are turned by the main motors (901 and 902), respectively, which are controlled using dual variable frequency drives. There is a gear reduction using different-sized timing belt pulleys (924-927 and 934-937, respectively) between the drive shafts and the mass shafts.

Figure 11:
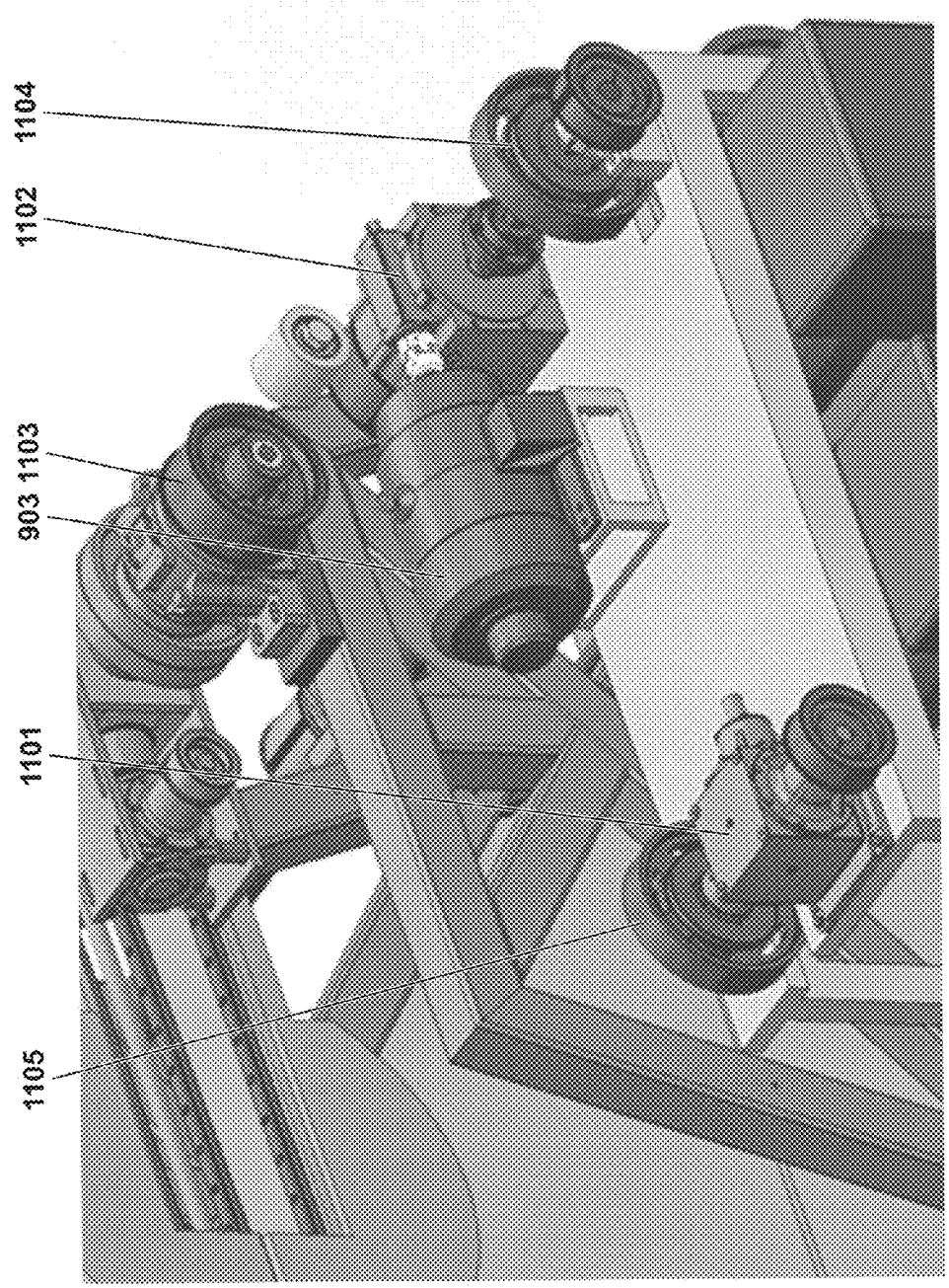
FIG. 11 is an expanded view of the eccentricity motor system in FIG. 9.
Figure 12:
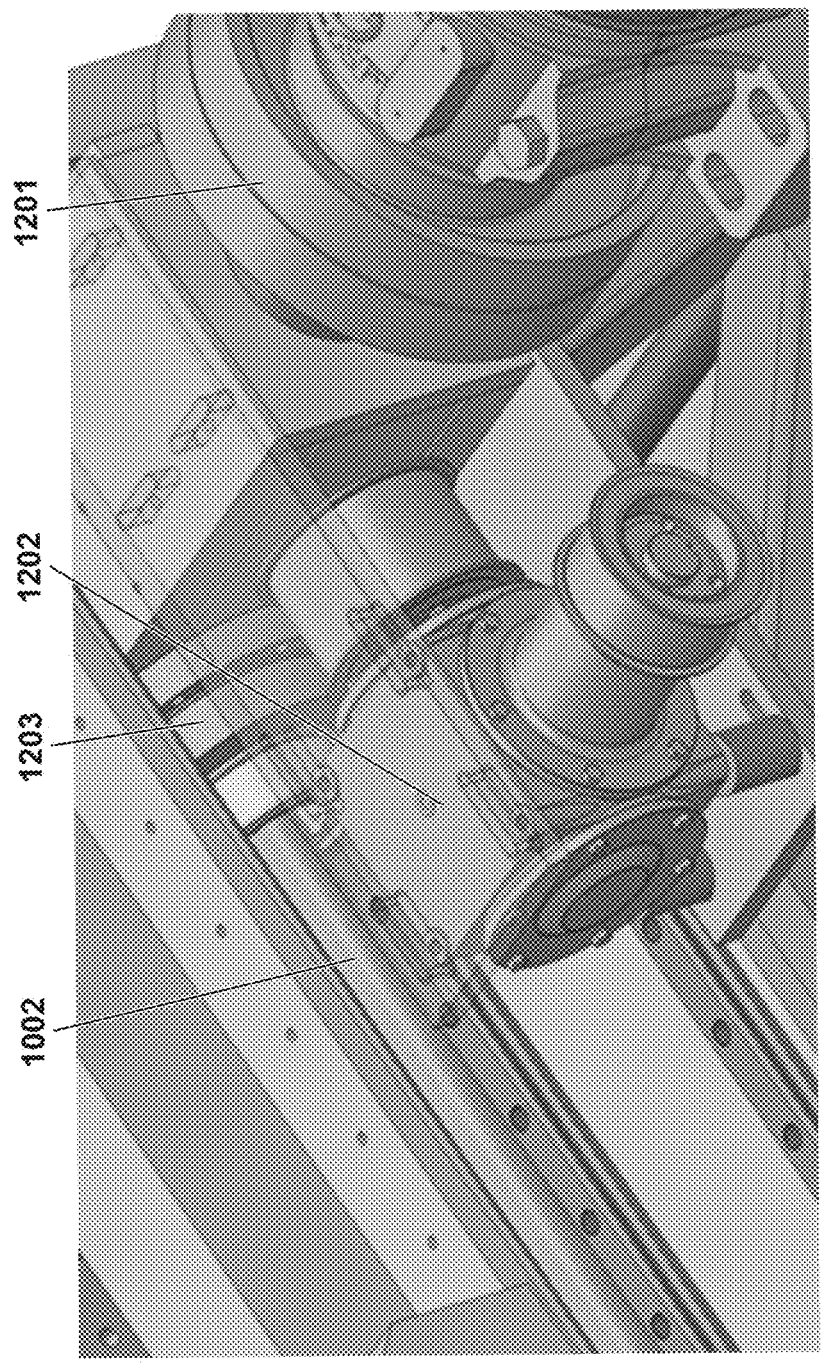
FIG. 12 is an expanded view of mass shaft eccentricity adjustment components shown in FIGS. 9 and 10.

A second pair of shafts 941 and 942, called the eccentricity shafts, is used to vary the eccentricity; one of the pair of shafts varies the eccentricity for the masses rotating clockwise, and the second shaft varies the eccentricity of the masses rotating counterclockwise. The two eccentricity shafts deliver a rate of rotation to assemblies 944-947 on each of the mass shafts, one for each eccentric mass. These shafts are both controlled by a third smaller variable speed drive and motor (903). See FIGS. 11-14. FIG. 11 is an expanded view of the eccentricity motor system showing the eccentricity motor 903, reversing gearbox 1101, eccentricity adjustment differential gearbox 1102, mass shaft reference speed pulley 1103, a first eccentricity drive pulley 1104, and a second eccentricity drive pulley 1105 that turns counter to the first eccentricity drive pulley 1104. The reversing gearbox 1101 allows one motor to drive two eccentricity shafts in opposite directions so as to adjust both the clockwise and counter-clockwise rotating masses.

The rotating speed of the main shaft is taken to the input of the differential gearbox 1102 with a 1:1 pulley 1103 in the embodiment of the invention depicted. Hence the output of the differential gearbox 1102 and reversing gearbox 1101, when motor 903 is not turning, is the same as the main shaft, but one is clockwise and one is counter-clock wise. This rotation speed is then taken to a double bearing mounted pulley 1201 on each main shaft. Timing belts 954-957 deliver the rate of rotation from the eccentricity shafts 941 and 942 to the bearing mounted double pulleys on each of the mass shafts. See FIG. 12, which is an expanded view of the mass shaft eccentricity adjustment components, showing a dual pulley 1201 mounted on a bearing to allow for relative motion causing eccentric mass translation, a right angle gearbox 1202, a roller nut assembly 1203, and a roller screw 1002. If the rotation speed of this pulley and the main shaft 1301 is the same, then there is no relative rotation of the pulley with respect to the main shaft. Hence the right angle gearbox 1202 connected by a timing belt (e.g. one of 964-967) to the bearing mounted pulley 1201 (and anchored to the main shaft) experiences no rotation. Then the output of the right angle gearbox 1202 transmitted by timing belt (not shown) to the roller nut assembly (1203) that drives the eccentric mass roller screw 1002, produces no motion and the eccentric mass maintains its position. But if motor 903 does rotate, then there is relative motion and the eccentric mass translates.

Figure 13:
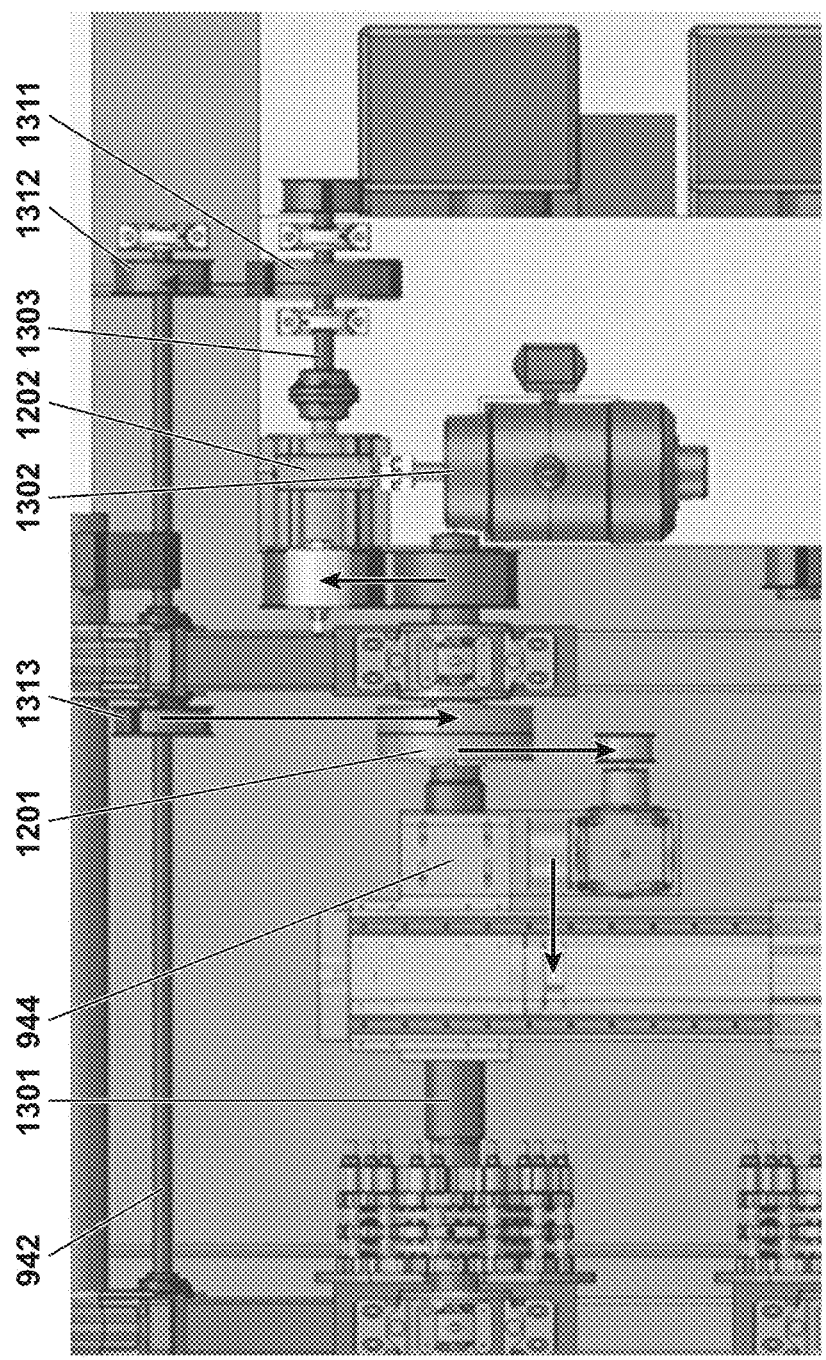
FIG. 13 is an expanded view of the eccentricity adjustment drive train path shown in FIG. 9.

FIG. 13 is an expanded view showing the eccentricity adjustment drive train path. As has been described above, the speed of the main mass shaft 1301 is passed directly into the input side of the differential gearbox 1202. The output of the differential gearbox is then speed adjusted by the eccentricity adjustment motor input at 1302. The adjusted speed is then present on the eccentricity adjustment main shaft at 1303, and is then passed through a series of net 1:1 gear ratio pulleys (1311-1313) to the bearing mounted pulley 1201. This pulley is free to rotate relative to 1301, and as such can pass a rotation through to the roller nut, thereby translating the mass along its linear bearing rails. The arrows in FIG. 13 show the direction of reference speed as it is passed through the drive train.

Hence when the rate of rotation delivered by the eccentricity shafts 941 and 942 to each of the assemblies 944-947 equals the rate of rotation of the mass shafts, no action on the mass eccentricity occurs. When motor 903 is not rotating, the input and output speeds of the differential gearbox 1102 are the same as the main mass rotating shafts. However, when the rate of rotation delivered by the eccentricity shafts 941 and 942 to each of the assemblies 944-947 differs from the rate of rotation of the mass shafts, the respective assemblies drive an axial-dual pulley/right angle drive/roller nut (1201/1202/1203) that, in turn, forces a roller screw 1002 to travel through the nut 1203. The eccentric masses are rigidly attached to the roller screw 1002, so as the roller screw travels, so does the eccentric mass, thereby moving the center of mass away or toward the axis of rotation. The eccentric masses are guided in this motion using multiple linear bearings and rails (see 1401 in FIG. 14). In this manner, the center of mass of each eccentric mass is moved to a new radius of rotation, thereby changing the eccentricity to anywhere between near zero and 100% of maximum.

Figure 14:
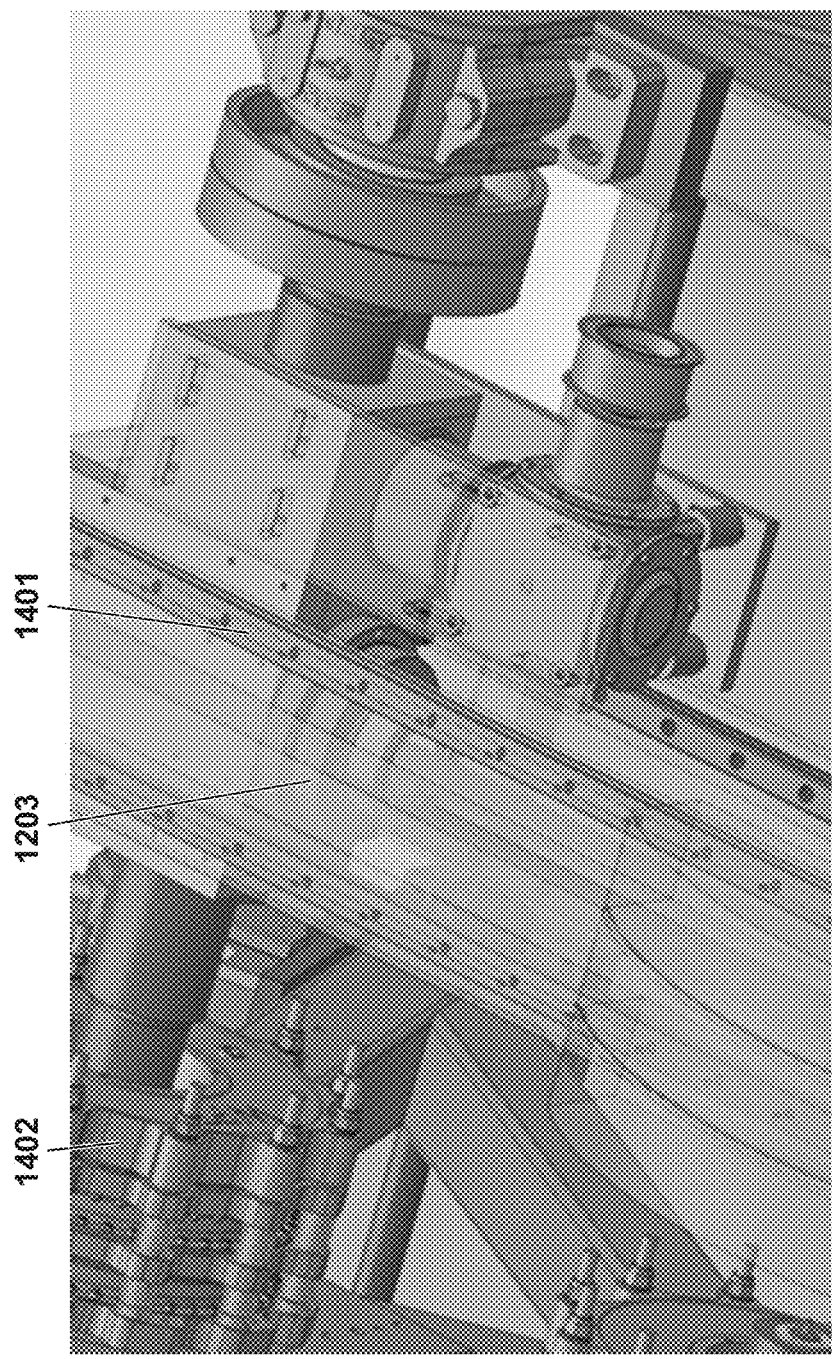
FIG. 14 is an expanded view of other mass shaft eccentricity adjustment components shown in FIGS. 9 and 10.

FIG. 14 is an expanded view of the mass shaft eccentricity adjustment components showing a linear bearing rail 1401, roller nut assembly 1203, and pneumatic brake 1402.

Hence, in overall summary, as motor 903 rotates clockwise or counter-clockwise it moves the eccentric masses in or out (less or more eccentricity). Therefore, the two main motors 901 and 902 control the rate of rotation and phase of the masses, while simultaneously and independently, the eccentricity motor (903) may turn to change the eccentricity of the weights.

Thus, this example embodiment shows one manner in which to enable a key aspect of the invention that requires the ability to vary the rotational frequency of the masses and simultaneously and independently vary the eccentricity of the masses (and consequently the force exerted by the vibrator). The main motors and eccentricity motor may therefore be controlled, for example by a sweep controller, in a manner to realize a controlled ground force sweep in which the frequency and force may be changed independently.

Figure 21:
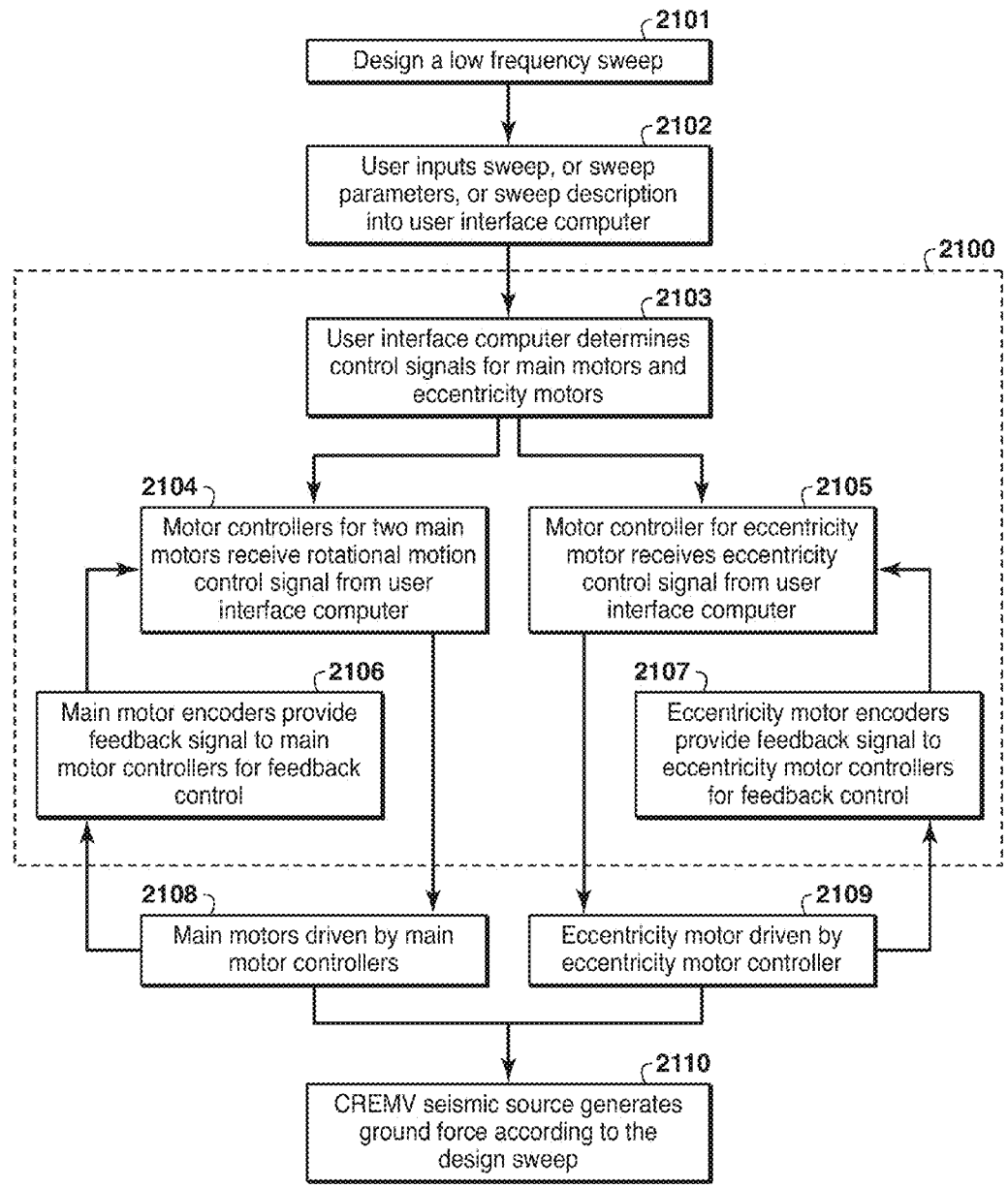
FIG. 21 is a flow chart illustrating features of a sweep controller.

FIG. 21 is a flow chart illustrating basic features of a sweep controller (2100). The process may begin with the design of a large force, low frequency ground force sweep (2101) that the operator wishes to implement. The sweep is input to a user interface computer by any of several means (2102). For example, the sweep time trace may be input directly, or parameters that describe the sweep and its characteristics may be input, or any other means to describe the sweep may be input. The user interface computer has software to determine, from the user input, the control signals for rotational frequency and eccentricity (2103) that are needed to realize the ground force sweep. For example, the user interface computer may be programmed to solve equation [5] or equation [7]. The rotational frequency signal is provided to the motor controllers for the main motors (2104), and the eccentricity control signal is provided to the motor controller for the eccentricity motor (2105). The controllers for the main motors provide the electrical power to drive the main motors according to the rotational frequency signal (2108), and the controller for the eccentricity motor provides the electrical power to drive the eccentricity motor according to the eccentricity control signal (2109). The motor controllers may also have a feedback feature, whereby encoders or other devices measure and monitor motor behavior and provide signals back to the controllers (2106 and 2107 for the main motors and eccentricity motor, respectively). The controllers analyze the feedback signals and modify the drive power, as needed, to maintain the desired motor actions. In this manner, the ground force may be made to follow the desired sweep to within a specified phase tolerance. The actions of the main motors and eccentricity motor drive the CREMV seismic source to produce the ground force sweep that was input by the operator (2110).

The phase position of the eccentric weights can be set to produce a uniaxial force at any angle to the vertical. This is due to their counter rotation. In many applications the direction of the uniaxial force would be set vertical, but any angle can be set, as needed. Note also that each eccentric mass shaft is provided with a brake 1402 to stop the masses quickly if needed, or just to end a sweep as in sweep segment 605 in FIG. 6B.

Figure 15:
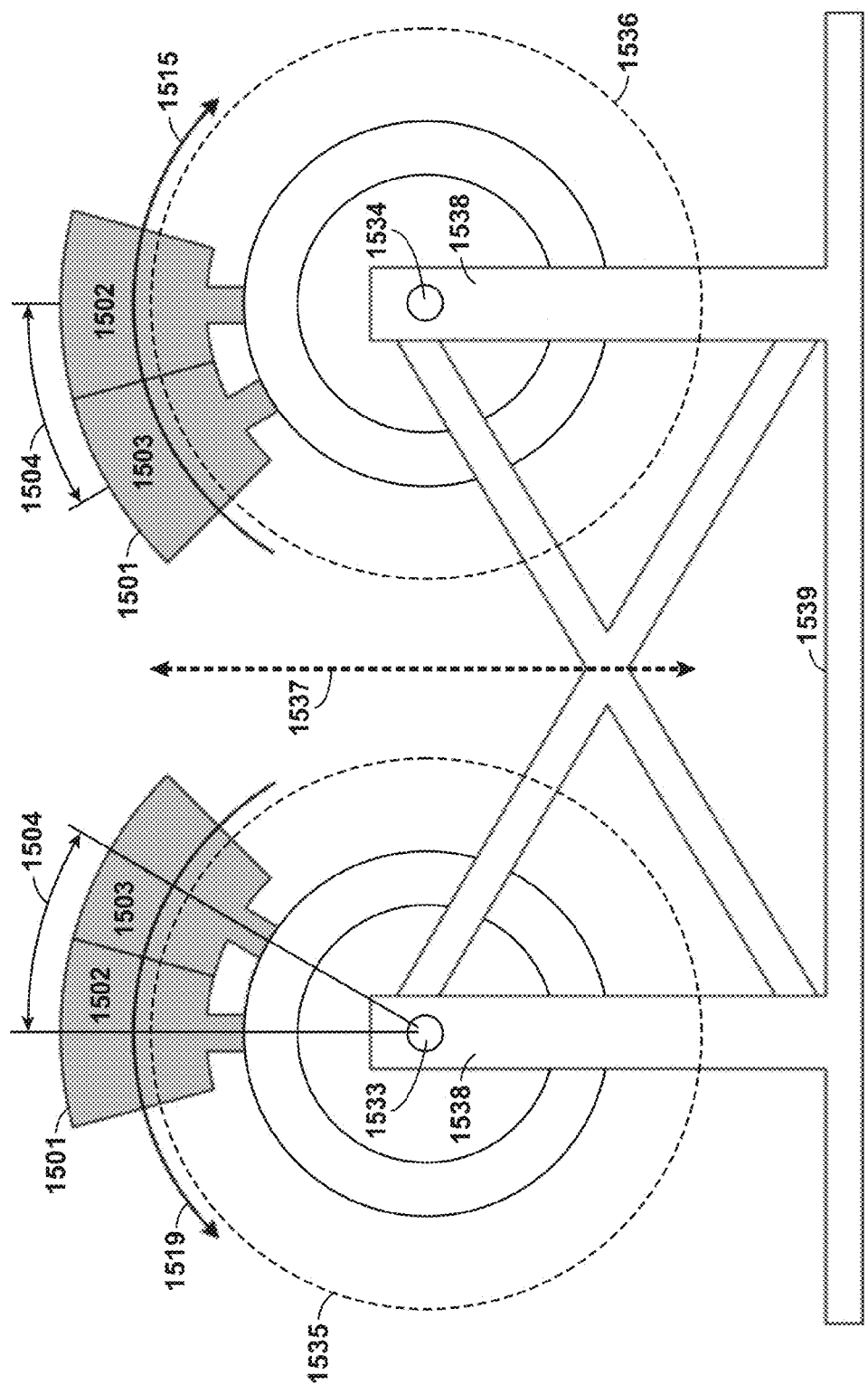
FIG. 15 illustrates a second embodiment of the CREMV apparatus of the present invention where eccentricity is made to vary by controlling the angle of separation between two parts of a rotating mass.

However, the example just described is but one of many possible embodiments of the method and apparatus. In other embodiments, the important feature of on-the-fly eccentricity adjustment may be accomplished in other ways. FIG. 15 shows one such alternative CREMV in which eccentricity is made to vary by controlling an angle of separation. Each of two counter-rotating mass elements (1501) is composed of two parts (1502 and 1503). The angle separation 1504 between those two parts can be controlled on-the-fly so that the two parts may be brought adjacent to one another for maximum eccentricity (as shown), or they may be positioned on opposite sides of the axis of rotation for zero or minimal eccentricity, or they may be positioned at some angle in between for an intermediate eccentricity. The center of mass of each mass element 1501 rotates about its respective axis of rotation (1533 and 1534) in a circular orbit (1535 and 1536) and in opposite senses 1515 and 1519 (i.e. clockwise versus counterclockwise), and the combined center of mass of the two counter rotating masses oscillates vertically (1537) between the two axes of rotation. Each axis of rotation is attached to a rigid structure 1538 and baseplate 1539.

Figure 16B:
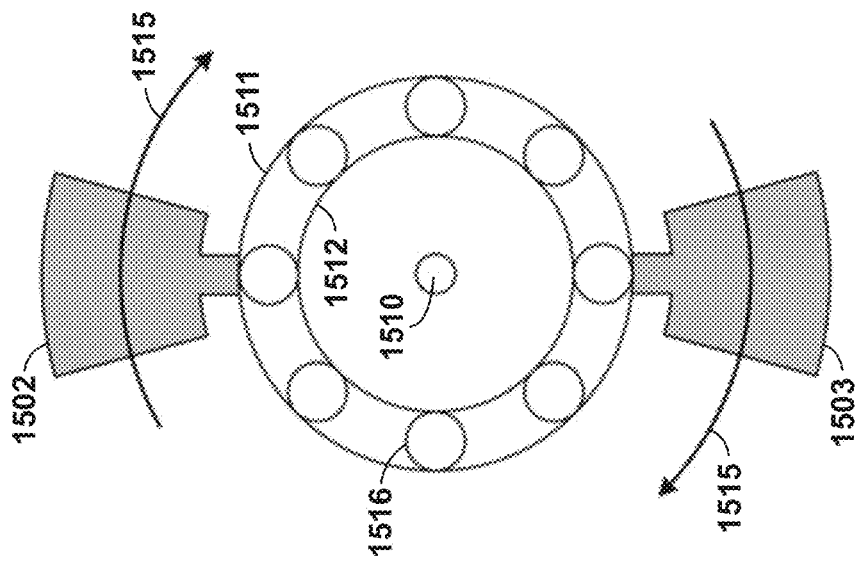
FIGS. 16A and 16B illustrate two views of one of the masses in the embodiment of FIG. 15, in its two parts.
Figure 16A:
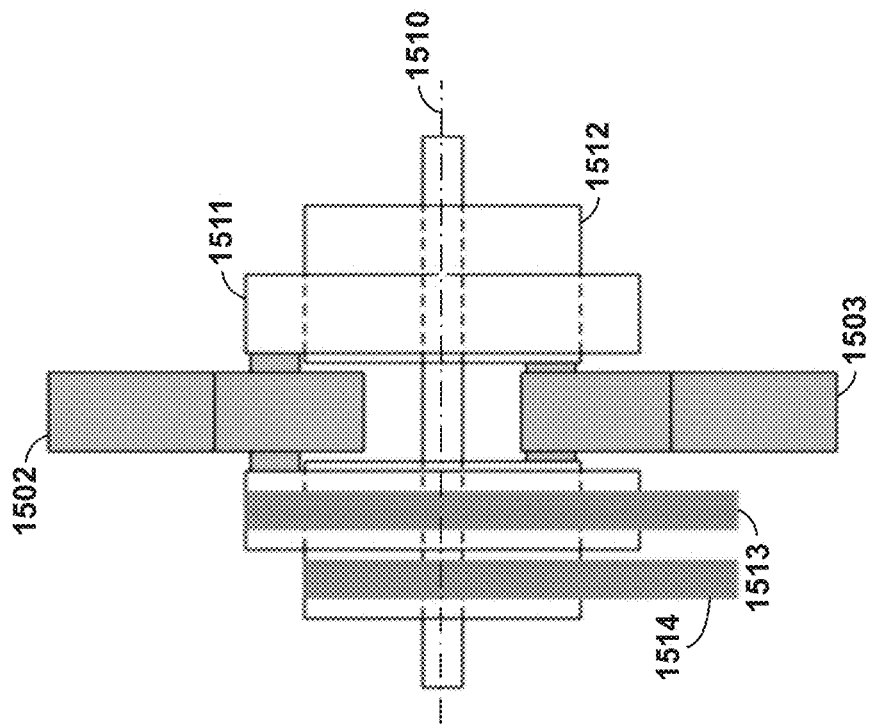

FIGS. 16A and 16B show two views of one of the masses of FIG. 15 in its two parts, with an angle of separation of 180 degrees illustrating the condition of zero or minimal eccentricity. The view in FIG. 16A is a broadside view orthogonal to the axis of rotation 1510. In this view, the two parts of the mass (1502 and 1503) rotate in and out of the plane of the figure. One part of the mass is rigidly attached to one cylinder (1511), and the other part of the mass is rigidly attached to another cylinder (1512), both cylinders concentric with the axis of rotation. Each cylinder is driven by a separate belt (1513 and 1514) allowing each of the two cylinders to be rotated at the same rotation rate, or allowing one cylinder to be rotated at a rate of rotation slightly larger or smaller than the other cylinder. In this way, the two parts of the mass may be rotated at the same rate thereby maintaining a constant angle of separation and eccentricity, or the two parts of the mass may be rotated at slightly different rates thereby changing the angle of separation between the two parts, and thus the eccentricity. The adjustments are made while the mass rotates. Therefore, the eccentricity may be changed on-the-fly while the mass rotates. Furthermore, the eccentricity may be changed even while the rotational frequency of the center of mass is changed. This enables the ability to independently vary the eccentricity and rotational frequency.

FIG. 16B shows and end-on view in-line to the axis of rotation (1510). In this view, the two parts of the mass (1502 and 1503) rotate in the plane of the figure. The direction of rotations is shown (1515). The two cylinders (1511 and 1512) that hold the two parts of the mass can rotate relative to one another. The smaller cylinder may be rigidly attached to the axis of rotation, while the larger cylinder may be supported by the smaller cylinder with a system of rollers (1516). These rollers maintain the larger cylinder concentric to the smaller cylinder and allow freedom of angular motion between the two cylinders. The angle of separation between the two parts of the mass that is shown in this figure is 180 degrees, so the center of mass is on (or near) the axis of rotation. In this case, the eccentricity is zero (or very small).

Figure 17:
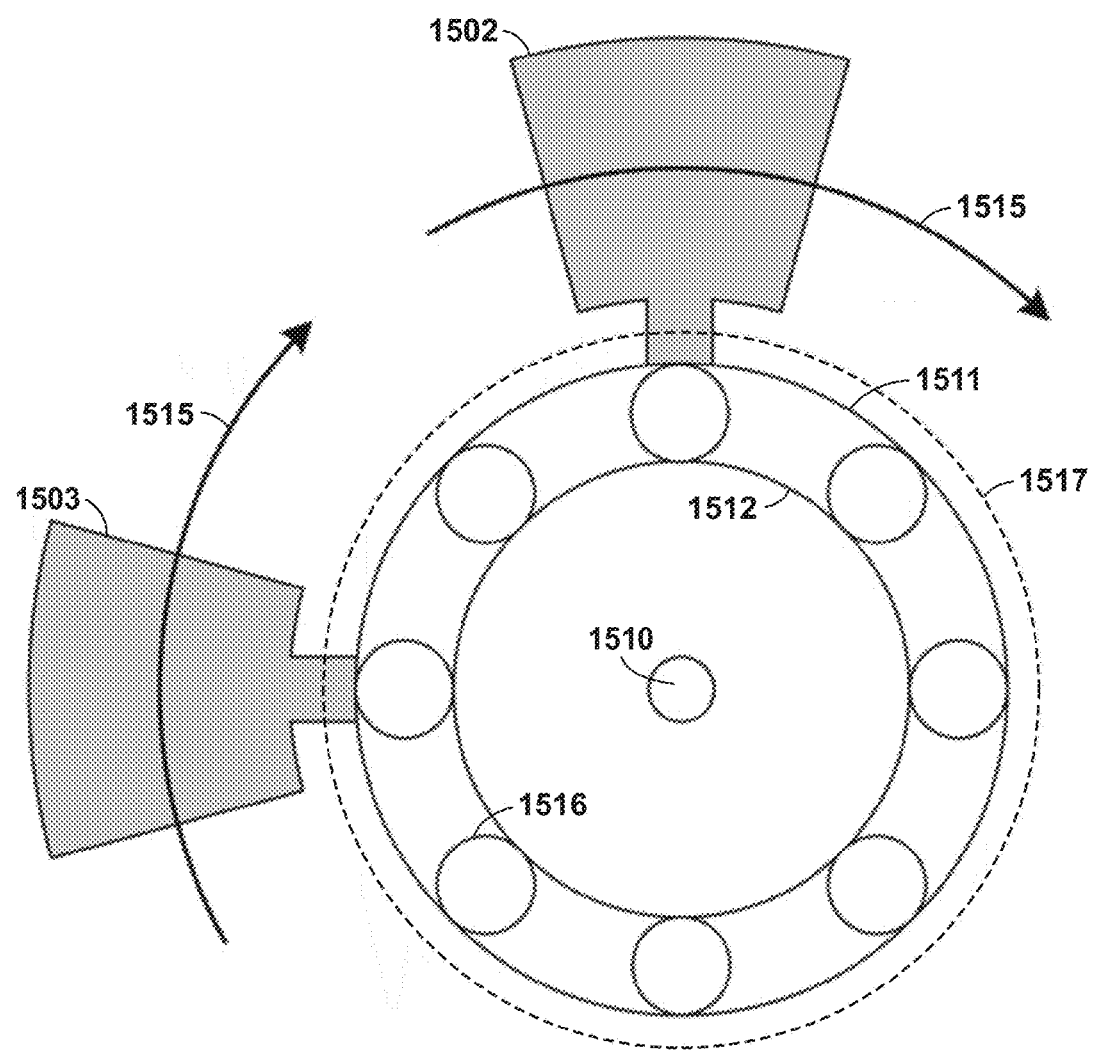
FIG. 17 illustrates an angle of separation between the two parts of the mass so as to provide a degree of eccentricity intermediate between FIG. 15 and FIGS. 16A-16B.
Figure 18:
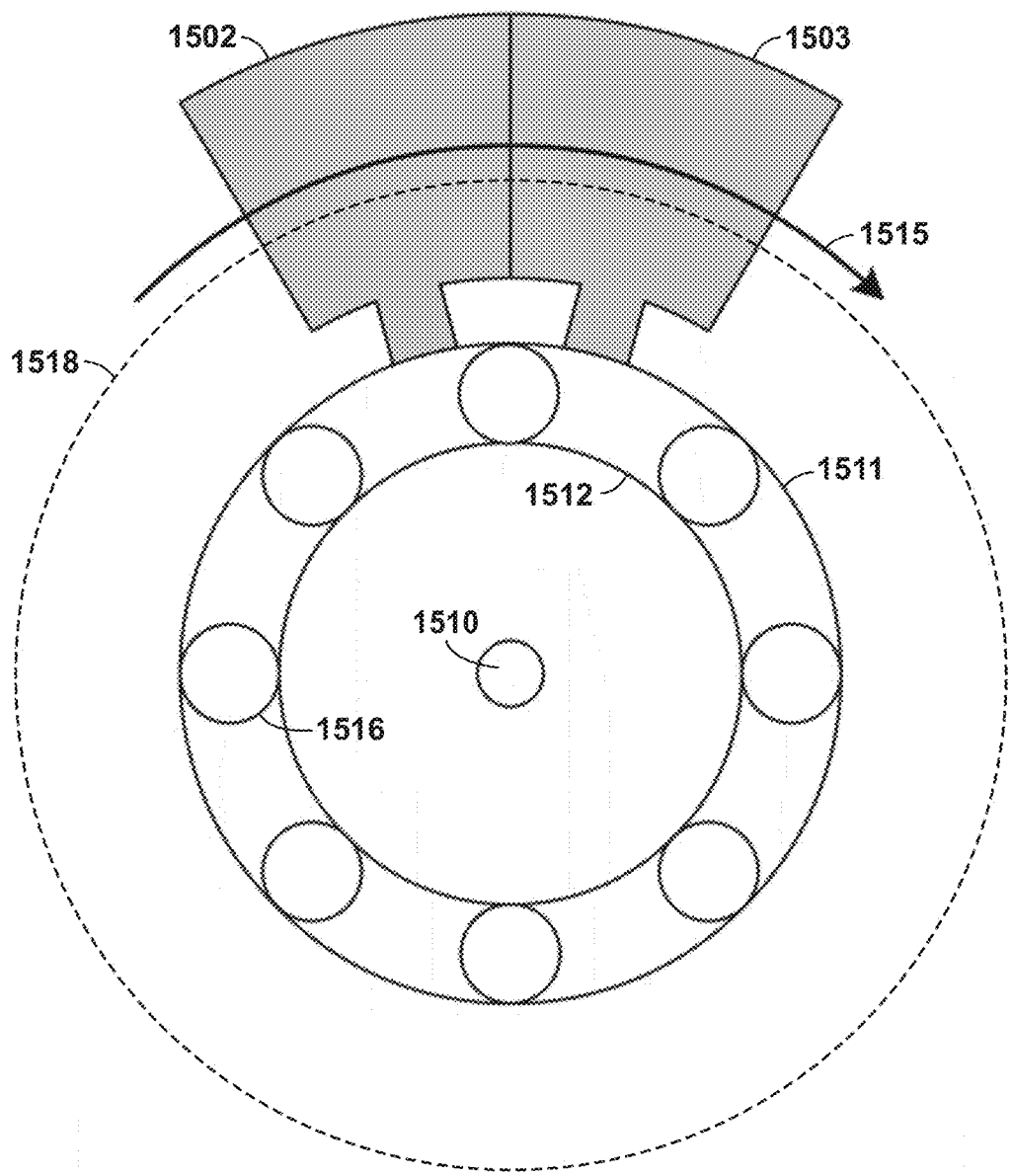
FIG. 18 illustrates the two parts of the mass brought adjacent to one another to provide maximum eccentricity, as in FIG. 15.

FIG. 17 is a view similar to FIG. 16B, but showing the angle of separation between the two parts of the mass reduced to provide an intermediate level of eccentricity. The center of mass now rotates 1517 at some finite radius from the axis of rotation 1510 resulting in an intermediate level of eccentricity. FIG. 18 shows the two parts of the mass brought adjacent to one another to provide maximum eccentricity. Now, the center of mass rotates 1518 at the maximum radius from the axis of rotation 1510 resulting in the maximum level of eccentricity.

Independently changing, on the fly, and accordingly to achieve a desired sweep, the rotational frequency and eccentricity, which is/was not possible in existing non-seismic CREMV devices or in the pre-hydraulic seismic vibrators, requires a means to manage the kinetic energy of the rotating masses. Changing the rotational frequency or the eccentricity of the masses, or both, causes changes in the angular momentum of the system. Increasing angular momentum requires power to add energy to the system, while decreasing angular momentum requires the dissipation or removal of energy from the system. A drive and drive controller must be able to apply torque to, or rotationally load, the system as rotational frequency and/or eccentricity are changed. For example, if eccentricity is unchanged, but rotational frequency is increased, the drive system must add energy to increase the angular momentum. If eccentricity is unchanged, but rotational frequency is decreased, the drive system must remove energy to decrease the angular momentum. If the rotational frequency is unchanged and the eccentricity is decreased, then the drive system must remove energy to decrease the angular momentum; but if the eccentricity is increased, the drive system must add energy to increase the angular momentum. If both the rotational frequency and eccentricity are changing simultaneously, then energy must be added or removed, according to the net effect of these changes on the angular momentum of the system. The motor power requirements to do this can be calculated.

Throughout the course of the sweep, the CREMV seismic source must be able to generate an oscillatory force matching the desired sweep, i.e. the desired force and frequency as a function of time, within some phase tolerance. FIG. 6C shows the cosine function of phase during the sweep shown in FIG. 6A. The phase corresponds to the rotational position of the masses as they rotate around their respective axes of rotation, recalling that the direction of rotation for one mass is opposite the direction of rotation for the other mass. Maintaining a phase tolerance, relative to the phase of the program sweep, that is similar to that of modern seismic vibrators places requirements on the CREMV seismic source drive and drive control systems. An automated feedback control system can "tell" the motor to increase or decrease torque to keep in phase. For example, a motor and motor controller used to power a CREMV seismic source must be adequate to maintain a desired phase tolerance. More powerful motors will be able to make faster changes in angular momentum or kinetic energy while maintaining the rotational position of the masses within a desired phase tolerance. Less powerful motors may be able to maintain the same phase tolerance, but only for sweeps requiring less demanding (slower) changes in angular momentum or kinetic energy.

Figure 19:
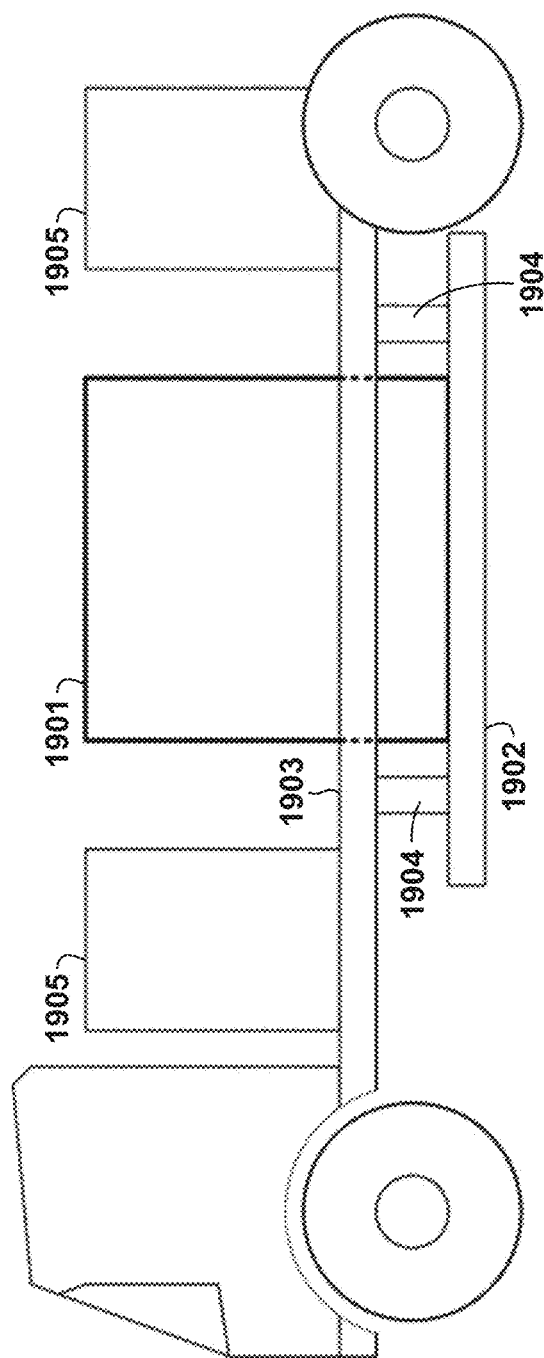
FIG. 19 illustrates a vehicle-mounted CREMV seismic source.

To enable operation in the manner of modern seismic prospecting practices, a CREMV seismic source is preferably mobile to allow its positioning at a large number of source stations, respectively, with time efficiency. For land-based applications, the required mobility may be achieved by mounting the CREMV on a vehicle or carrier similar to that used for seismic vibrators, or otherwise capable of traversing terrains typically encountered in seismic prospecting. FIG. 19 is a schematic illustrating a vehicle mounted CREMV seismic source. The CREMV, seated inside an enclosure 1901, is rigidly attached to a baseplate 1902 that may be raised or lowered from the truck bed 1903 by hydraulic 1904 or other means. In the lowered position, the baseplate is resting firmly on the ground and ready for operation. The weight of the vehicle may be used as hold down force, and may be vibration isolated from the baseplate and CREMV. In the raised position, the baseplate clears the ground and the vehicle may freely move to a new source station or other deployment. The truck bed may also carry enclosures 1905 for generators, motors, controllers, hydraulics, or other equipment as may be needed.

Figure 20:
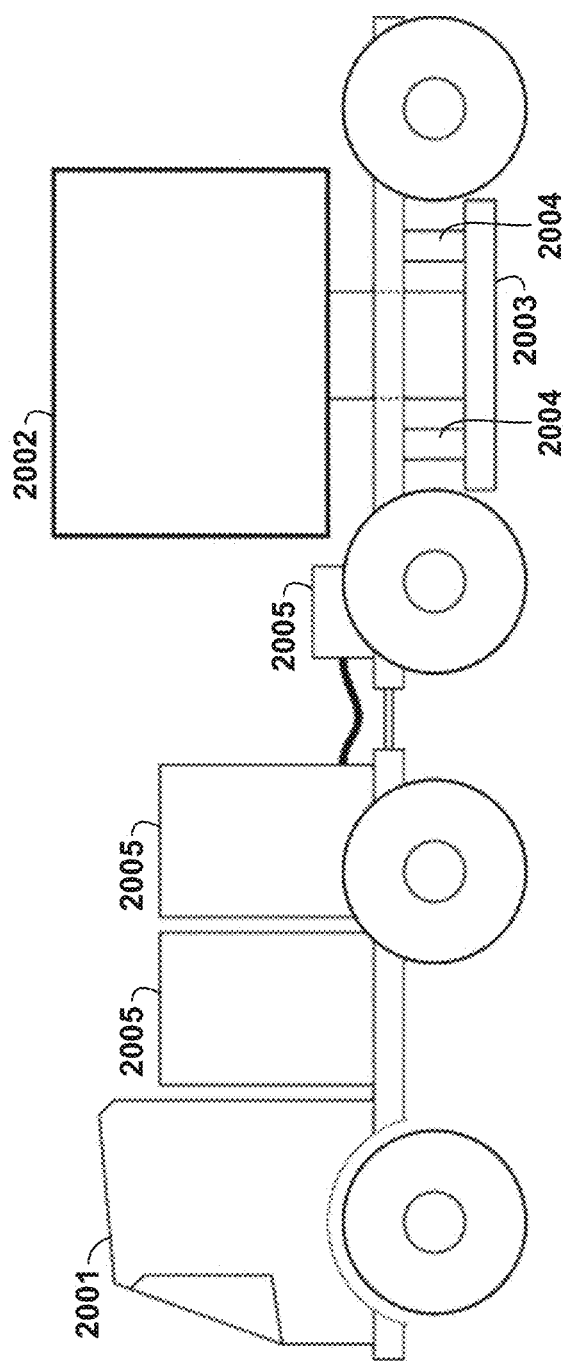
FIG. 20 illustrates a trailer-mounted CREMV seismic source towed by a support vehicle.

FIG. 20 is a schematic illustrating a trailer-mounted CREMV seismic source towed by a support vehicle 2001. The CREMV, seated inside an enclosure 2002, is rigidly attached to a baseplate 2003 that may be raised or lowered from the trailer bed by hydraulic (2004) or other means. In the lowered position, the baseplate is resting firmly on the ground and ready for operation. The weight of the trailer may be used as hold down force, and may be vibration isolated from the baseplate and CREMV. In the raised position, the baseplate clears the ground and the trailer may be freely towed to a new source station or other deployment. The trailer bed, or the truck bed of the support vehicle, may carry enclosures 2005 for generators, motors, controllers, hydraulics, or other equipment as may be needed.

For marine applications, the required mobility may be achieved by mounting the CREMV inside a water-proof enclosure that can be towed by a seismic source marine vessel as commonly employed in the practice of marine seismic prospecting, or other marine vessel. This was previously described in connection with FIG. 5. As in the modern practice of marine seismic prospecting in towing air guns and other seismic source types, the CREMV seismic source may be towed at a near continuous rate through the water even as it is activated and implements a sweep. In this case, the sweep is completed as the source travels over some distance determined by the speed of the vessel and the duration of the sweep. The source vessel may slow down during source activation so that the sweep may be completed over a shorter distance of travel, or the source vessel may operate so as to position the CREMV seismic source and maintain it stationary while it completes a sweep.

In addition to applications in seismic prospecting for the purpose of hydrocarbon (and mineral) exploration, the disclosed invention may also have other applications. For example, the invention may be used for seismic surveys of deep geologic structures such as earthquake fault zones, ground wave transmission paths, tectonic plates, and the Mohorovicic discontinuity. Additional applications may include modal surveys of large civil structures at high amplitudes such as foundations, dams, nuclear power plants, etc.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A seismic vibrator comprising:
an actuator comprising two oppositely rotating, adjustably eccentric masses;
a motor that powers the actuator, and controls a rotation frequency of the eccentric masses;
an eccentricity adjustment system that changes eccentricity while the actuator is operating, whether or not the rotation frequency is simultaneously being changed, and independent of any change in rotational frequency; and
a sweep controller that controls the motor and the eccentricity adjustment system to provide a combination of eccentricity and frequency required to produce an output proportional in magnitude to, and in phase with, a pre-selected sweep input signal.

2. The vibrator of claim 1, wherein the output is in phase within a pre-determined tolerance.

3. The vibrator of claim 1, wherein the two masses are identical in weight and shape.

4. The vibrator of claim 1, further comprising at least a second pair of oppositely rotating, adjustably eccentric masses, wherein all rotating masses are mounted in a linear array on a rigid frame with alternating rotational directions.

5. The vibrator of claim 4, wherein the rotational frequency is the same for all masses, and all axes of rotation are parallel.

6. The vibrator of claim 5, wherein counter rotating pairs each rotate in a same plane.

7. The vibrator of claim 5, wherein each rotating mass rotates in a different but parallel plane, and clockwise rotating masses are alternated with counterclockwise rotating masses in a direction perpendicular to the parallel planes.

8. The vibrator of claim 1, wherein the motor comprises a first motor powering clockwise mass rotation and a second motor powering counterclockwise mass rotation.

9. The vibrator of claim 8, wherein each rotating mass is rigidly attached to a rotatable shaft such that radius of rotation of center of mass relative to the shaft is adjustable within a range of adjustment.

10. The vibrator of claim 9, further comprising a rigid structure on which the rotatable drive shafts are mounted, said rigid structure being adapted to be placed on the ground, but movable from one location to another.

11. The vibrator of claim 10, wherein the eccentricity adjustment system comprises an eccentricity motor that changes the radius of rotation of each rotating mass and a central processing unit programmed to relate amplitude and frequency, as given by an input ground force sweep signal, to eccentricity or radius of rotation of the rotating masses.

12. The vibrator of claim 11, further comprising a system of pulleys and belts to connect the first motor, the second motor, and the eccentricity motor to the rotating masses.

13. The vibrator of claim 11, further comprising a differential and reversing gearbox that connects the eccentricity motor to the rotating masses to increase the radius of rotation, or to decrease the radius of rotation.

14. The vibrator of claim 11, wherein the first motor, the second motor, the eccentricity motor, the rotating masses, and the range of adjustment are designed to transmit a constant downward reaction force through the rigid structure to the ground of at least 275 kN as frequency increases from 1 Hz to 5 Hz in a 10 second sweep segment.

15. The vibrator of claim 9, wherein the radius of rotation at maximum eccentricity is at least 50 cm.

16. The vibrator of claim 15, wherein the radius of rotation at minimum eccentricity is 0 cm.

17. The vibrator of claim 1, wherein each rotating mass is divided into two parts, angularly separable from each other, and the eccentricity adjustment system comprises an eccentricity motor that changes the angular separation.

18. The vibrator of claim 1, further comprising a rigid waterproof container that contains, rigidly mounted, the actuator, motor, and eccentricity adjustment system, wherein the oppositely rotating, adjustably eccentric masses are mounted co-axially.

19. A method for seismic prospecting or other subsurface structure determination, comprising:
constructing or obtaining a counter-rotating, adjustably eccentric, mass actuator (CREM), and operating it so that rotational frequency and eccentricity are varied during operation, and independently of each other;
mounting the CREM on a rigid structure to make a seismic vibrator; and
operating the seismic vibrator, comprising:
continuously varying rotational frequency according to a selected ground force sweep signal, including frequencies ≤5 Hz; and
adjusting eccentricity as the rotational frequency is varied to provide a downward force as a function of frequency and time corresponding to the selected ground force sweep signal.

20. The method of claim 19, wherein a downward force of at least 275 kN is generated for frequencies in a range 1 Hz-5 Hz.

21. The method of claim 19, further comprising:
recording seismic signals with one or more seismic detectors; and
processing the recorded seismic signals and interpreting the processed results for indications of hydrocarbons.

22. The method of claim 19, wherein the operating is performed for a purpose of hydrocarbon or mineral exploration or for other subsurface geologic structure determination.

23. The method of claim 19, wherein the rigid structure is a waterproof canister and the rotating masses are mounted co-axially, and further comprising submerging the canister below the water surface in a sea or ocean, deploying one or more seismic receivers in the water, and recording seismic signals generated by the CREM.

24. The method of claim 19, wherein the mass of each rotating mass and total displacement or stroke through which center of mass of each rotating mass moves are calculated to offset $1/f^2$ ground force frequency dependence in a specified low-frequency range.

25. The method of claim 24, wherein the product of mass times displacement times frequency squared >1,000 Kg m s$^{-2}$ for 1 Hz<frequency<5 Hz.

26. The vibrator of claim 1, wherein in response to a preselected sweep input signal in which ground force as a function of time of sweep has an envelope A(t) and frequency as a function of time of sweep is f(t), the sweep controller controls the eccentricity adjustment system to change eccentricity e(t) as a function of time according to $$e(t) = \frac{A(t)}{4\pi^2 f^2(t)}.$$

27. The method of claim 19, wherein the selected ground force sweep signal is characterized by a ground force as a function of time of sweep with an envelope A(t) and frequency as a function of time of sweep f(t), and wherein said adjusting of eccentricity as the rotational frequency is varied changes eccentricity e(t) as a function of time according to $$e(t) = \frac{A(t)}{4\pi^2 f^2(t)}.$$

* * * * *